United States Patent [19]

Kitakado et al.

[11] Patent Number: 5,144,681
[45] Date of Patent: Sep. 1, 1992

[54] METHOD OF AND APPARATUS FOR INSPECTING CONDUCTIVE PATTERN ON PRINTED BOARD

[75] Inventors: Ryuji Kitakado; Hironobu Yano; Hiroaki Kakuma; Tetsuo Hoki; Takao Kanai, all of Kyoto, Japan

[73] Assignee: Dainippon Screen Mfg. Co., Ltd., Japan

[21] Appl. No.: 674,546

[22] Filed: Mar. 22, 1991

Related U.S. Application Data

[62] Division of Ser. No. 500,294, Mar. 27, 1990, Pat. No. 5,027,417.

[30] Foreign Application Priority Data

| Mar. 31, 1989 | [JP] | Japan | 1-82117 |
| May 12, 1989 | [JP] | Japan | 1-119056 |
| May 25, 1989 | [JP] | Japan | 1-131876 |
| Jun. 27, 1989 | [JP] | Japan | 1-164330 |
| Jun. 27, 1989 | [JP] | Japan | 1-164331 |

[51] Int. Cl.$^5$ ............................................. G06K 9/00
[52] U.S. Cl. .................................. 382/8; 382/25; 358/101; 358/106; 358/107; 364/559
[58] Field of Search ............. 382/8, 9, 16, 25; 364/488, 489, 490, 559, 560, 563; 358/101, 106, 107

[56] References Cited

U.S. PATENT DOCUMENTS

| 4,661,984 | 4/1987 | Bentley | 382/65 |
| 4,776,022 | 10/1988 | Fox et al. | 358/106 |
| 4,797,939 | 1/1989 | Hoki et al. | 358/107 |
| 5,027,295 | 6/1991 | Yotsuya | 358/106 |
| 5,027,417 | 6/1991 | Kitakado et al. | 358/106 |

Primary Examiner—Jose Cuoso
Attorney, Agent, or Firm—Ostrolenk, Faber, Gerb & Soffen

[57] ABSTRACT

A printed circuit board (11) is provided with a conductive pattern (P, R) and a through hole (H) thereon. Respective images of the conductive pattern and a through hole are photoelectrically read with an image reader (20). The conductive pattern image is magnified in size to obtain a magnified pattern image ($PI_m$), while the hole image is magnified at different magnification factors to obtain magnified hole images ($HI_n$, $HI_{n-1}$). A ring image (RP) is defined by the difference of the magnified hole images. The overlapped region (WR) on which the ring image and the magnified pattern image overlap each other is then calculated, and a defect or an opening of the conductive pattern is detected by calculating the aperture angle ($\theta$) of the overlapped image.

4 Claims, 31 Drawing Sheets

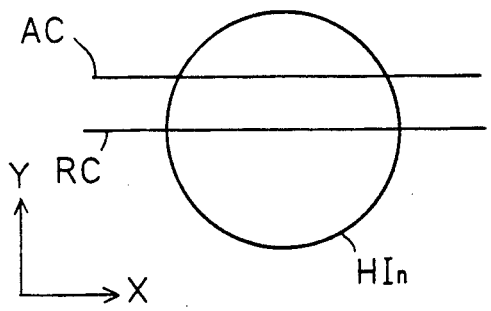
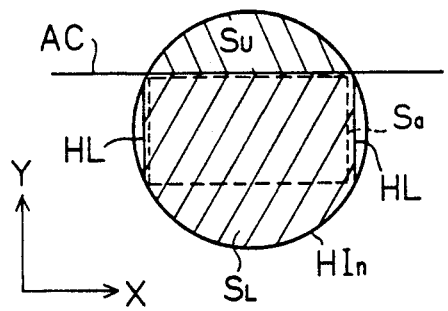
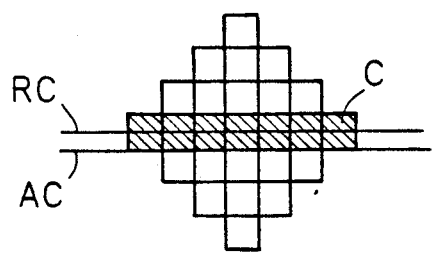
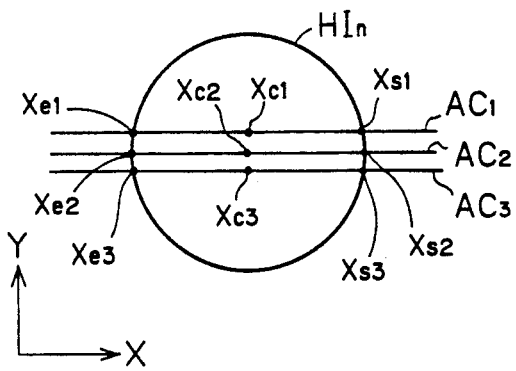
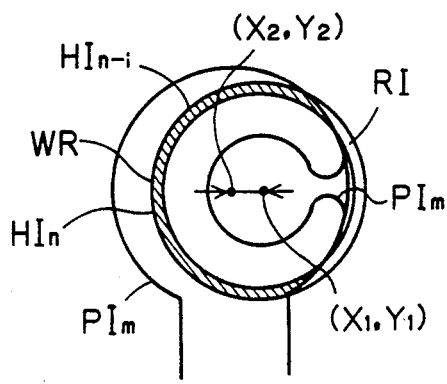

1

METHOD OF AND APPARATUS FOR INSPECTING CONDUCTIVE PATTERN ON PRINTED BOARD

This is a division of application Ser. No. 07/500,294, filed Mar. 27, 1990 now U.S. Pat. No. 4,027,417.

BACKGROUND OF THE INVENTION

1. Field of the Invention

The present invention relates to a method of and an apparatus for inspecting an electrically-conductive pattern on a printed board, and more particularly to an improvement in inspecting a printed circuit board for positional discrepancy between a wiring pattern and a through hole which may be a mini-via hole.

2. Description of Background Arts

As small electronic elements having high performance have been brought to the field of electronic engineering, printed circuit boards on which fine electrically-conductive patterns are formed at a high density have been utilized for mounting and interconnecting these electronic elements. The fine conductive patterns can be obtained by making the width of wiring patterns narrow and by decreasing the diameter of through holes. In particular, through holes having a diameter of 0.1 mm to 0.5 mm are now utilized in multilayer boards in place of conventional through holes having diameter of 0.8 mm, and the former are called as mini-via holes.

As the diameter of through holes becomes small, required are new techniques in various aspects such as plating treatment, drilling and reliability test of the through holes.

In general, the accuracy in drilling is inferior to that in photoetching process, and therefore, the through holes are often formed at positions deviated form target positions on conductive patterns. However, slight deviation of the through holes from the target positions causes substantially no problem in the electronic reliability of the printed circuit board in the case where the diameter of the through holes is about 0.8 mm, because relatively large lands are provided around the target positions for accepting the through holes.

On the other hands, the diameter of the lands are made small in proportion to the reduction of the diameter of the through holes, and it becomes difficult to always form the through holes in the lands by drilling. Accordingly, positional deviation of the through holes from the lands often affects the electronic reliability of the printed circuit board, and inspection of the circuit board for the positional deviations of the through holes becomes important.

The inspection of printed boards for positional deviation of through holes requires two approaches, one of which is electronic inspection and the other is visual inspection. A conventional apparatus for the visual inspection is operable to detect leak lights from cracks of a metal plate. However, the detection with the conventional apparatus is not satisfactory when the same is applied to the inspection of multi-layer printed board in which relatively large number of layers are laminated. Furthermore, the conventional apparatus is not effective in detecting pattern breaks which are caused by positional discrepancy between through holes and conductive patterns.

In order to show an example of the pattern breaks, FIG. 1 and FIG. 2 are now referred where the positional relations between a land R and a through hole H are illustrated. The center point O of the through hole H in FIG. 1 is located just on the center point of the land R, and therefore, the pattern in FIG. 1 is non-defective. On the other hand, the center point O of the through hole H in FIG. 2 is deviated from that of the land R, and part of the through hole H projects into the exterior of the land R. The size of the projecting part can be expressed by the aperture angle $\theta$. That is, it is concluded that the pattern is defective when the aperture angle is larger than a predetermined threshold angle.

FIG. 3 and FIG. 4 illustrate the positional relations between a linear part PL of a wiring pattern and a through hole H. The center point O of the through hole H in FIG. 3 is located at the center line CL of the linear part PL, and the pattern is non-defective. On the other hand, the center point O in FIG. 4 is deviated from the center line CL, and part of the through hole H projects into the exterior of the linear part PL. The size of the projecting part is also expressed by the aperture angle $\theta$, and the pattern is defective when the aperture angle $\theta$ is larger than a threshold angle.

Therefore, the detection of the aperture angle $\theta$ is effective in determining whether the pattern breaks are allowable ones or not, and the same has been performed in conventional techniques by observing the pattern break with human eyes and a magnifying lens. The visual observation with human eyes requires a long time for completion of the visual observation, and the inspection accuracy depends on the skill of an inspector. Consequently, it has been desired to develop a technique for inspecting printed boards which can be applied to an automatic inspection.

A technique for the automatic inspection cannot be established without establishing a method of reading the respective images of through holes and wiring patterns at a high accuracy. However, since the opening edges of through holes have indentations or inclinations at which the optical reflection property is not constant, it has been difficult to binalize the respective images of through holes and lands.

SUMMARY OF THE INVENTION

The present invention is directed to a method of inspecting a printed board for pattern defects, the printed board being provided with an electrically-conductive pattern and a through hole thereon.

According to the present invention, the method comprises the steps of: (a) photoelectrically reading an image of the printed board; and (b) dividing the image of the printed board into a pattern image representing the conductive pattern and a hole image representing the through hole.

In the next step (c), first and second images are obtained by selectively performing one of the steps of: (c-1) obtaining the first image by magnifying the pattern image and defining the second image with the hole image itself; (c-2) defining the first image with the pattern image itself and obtaining the second image by magnifying the hole image; and (c-3) obtaining the first and second images by magnifying the pattern image and the hole image, respectively.

This process step (c) is followed by the steps of: (d) detecting positional relation between the first and second images and representing the positional relation with a parameter value; and e) comparing the parameter value with a predetermined reference value and thereby judging whether the conductive pattern has a non-allowable defect or not.

In the present invention, the "conductive pattern" may include a land as well as a straight part.

Preferably, the step (c-3) includes the steps of: (c-3-1) magnifying the pattern image and thereby obtaining the first image; and (c-3-2) magnifying the hole image at different two magnification factors and thereby obtaining first and second magnified hole images, respectively, the second image consisting of the first and second magnified hole images.

In an aspect of the present invention, the step (d) includes the steps of: (d-1) calculating a difference between the first and second magnified hole images and thereby obtaining a ring image; and (d-2) comparing the first image with the ring image to detect the positional relation and determining the parameter value in accordance with the positional relation.

In another aspect of the present invention, the step (d) includes the steps of: (d-1) obtaining a center line of the second image; (d-2) defining a reference point on the center line; (d-3) calculating a first distance from the reference point to a contour of the first image as measured in the reference direction; (d-5) comparing the first and second distances with each other: (d-6) repeating the steps (d-2) through (d-5) while changing a position of the reference point on the center line, whereby a plurality of comparison results are obtained in the step (d-5): (d-7) calculating a length of a break in the wiring pattern as a function of the plurality of comparison results: and (d-8) determining the parameter value as a function of the length of the break.

In another preferred embodiment, the process steps (d) and (e) as defined above are replaced with the combination of the steps of: (d) obtaining an overlapped region image representing an overlapped region on which the first and second images overlap each other; (e) defining a two-dimensional radial operator having unit operators which extend from a radiant center point to different directions; (f) detecting end points of the overlapped region image by applying the radial operator to the overlapped region image while relatively moving the radial operator and the overlapped region image: (g) detecting a center point of the second image., (h) calculating an aperture angle of the conductive pattern as a function of positional relation between the end points and the center point of the second image; and (i) comparing the aperture angle with a predetermined reference angle and thereby judging whether the wiring pattern has a non-allowable defect or not.

In another aspect of the present invention, the radial operator is applied to the overlapped region of the magnified hole image and the pattern image under the condition where the radiation center point is positioned at a center point of the hole image.

The present invention is also directed to apparatuses suitable for conducting the above-defined methods.

Accordingly, an object of the present invention is to provide a method of and apparatus for inspecting patterns on a printed board which can be applied to an automatic inspection of the patterns and in which defects in the patterns can be accurately recognized through an accurate detection of an aperture angle.

These and other objects, features, aspects and advantages of the present invention will become more apparent from the following detailed description of the present invention when taken in conjunction with the accompanying drawings.

BRIEF DESCRIPTION OF DRAWINGS

FIG. 20 illustrates a positional relation between an assumed center line and a real center line on a magnified hole image;

FIG. 21 illustrates a principle of detecting the real center line;

FIG. 22 illustrates an example of a difference area;

FIG. 23 illustrates a principle of a labelling process;

FIG. 24 illustrates an example of a labelling rule;

FIG. 27 illustrates another example of an overlapped region;

DESCRIPTION OF PREFERRED EMBODIMENTS

A. First Preferred Embodiment

(A-1) Overall Structure and Operation

Figure 1:
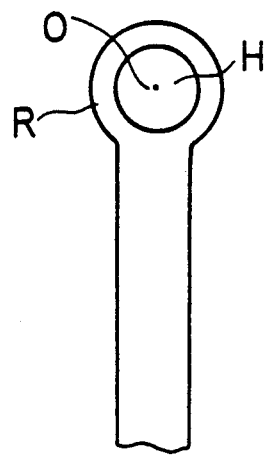
FIG. 1 illustrates a normal relation between the position of a land and that of a through hole.
Figure 2:
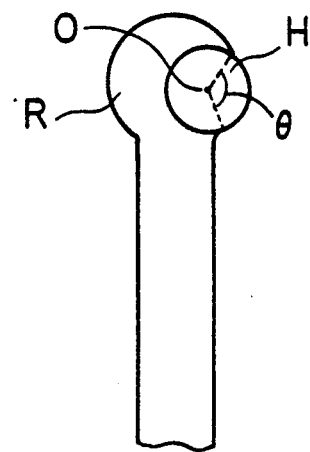
FIG. 2 illustrates a defective relation between the position of a land and that of a through hole.
Figure 3:
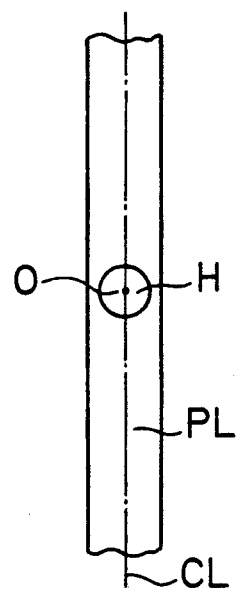
FIG. 3 illustrates a normal relation between the position of a wiring pattern and that of a through hole.
Figure 4:
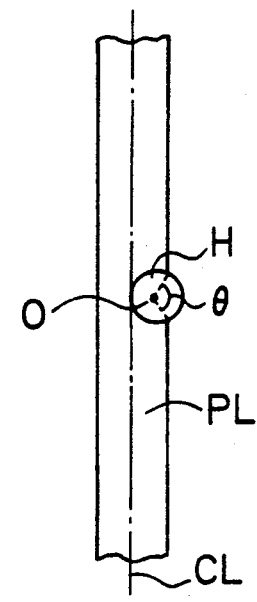
FIG. 4 illustrates a defective relation between the position of a wiring pattern and that of a through hole.
Figure 5:
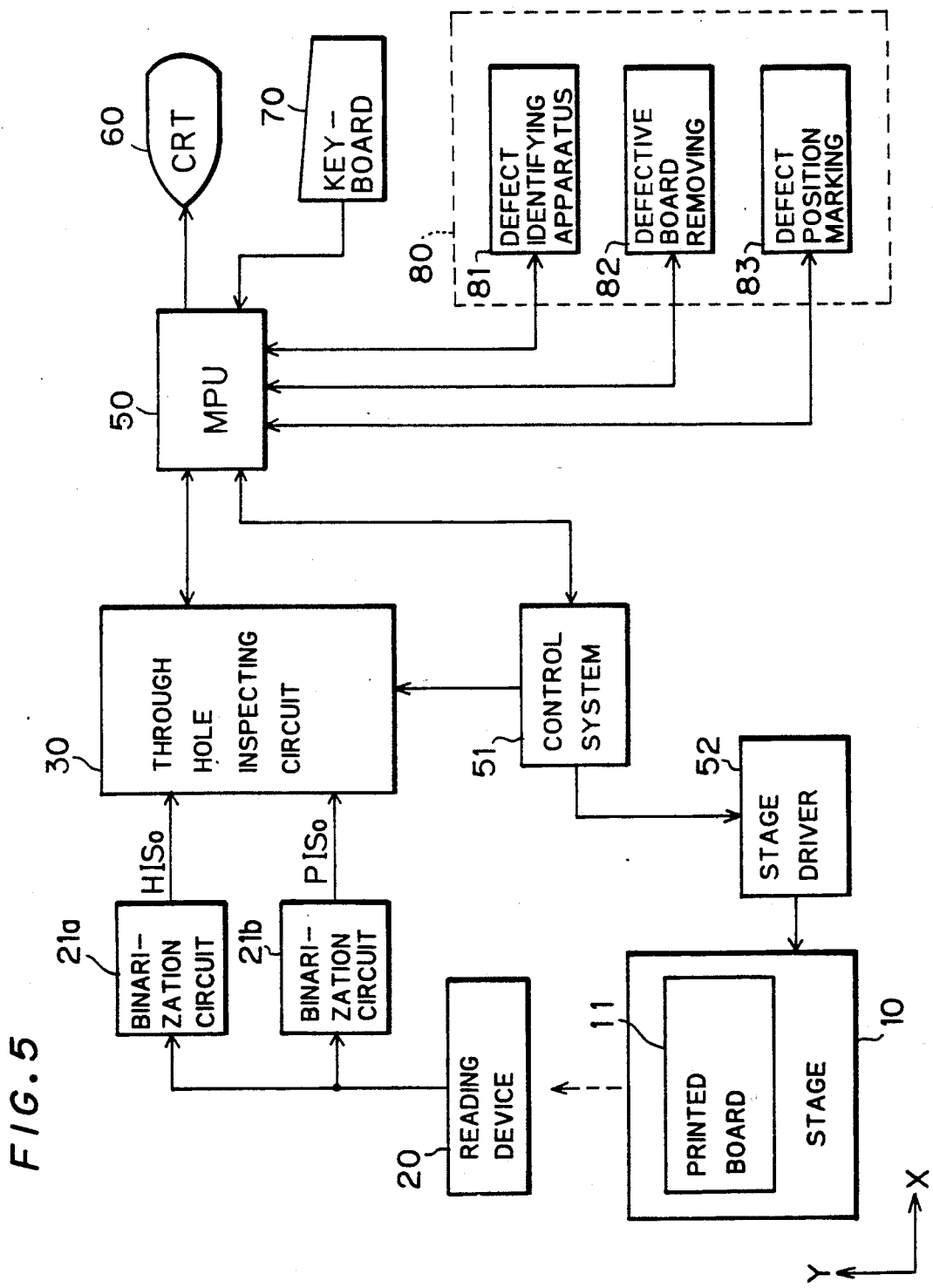
FIG. 5 is a block diagram showing the overall structure of an inspecting device according to a first preferred embodiment of the present invention.

FIG. 5 is a block diagram showing the overall structure of a pattern inspection device according to a first preferred embodiment of the present invention.

A printed circuit board 11 to be inspected is placed on a stage 10. The printed board 11 is fed in a feeding direction Y while the image of the printed board 11 is photoelectrically read by a reading device 20 for each scanning line extending in a line direction X. The reading device 20 comprises an alignment of charge coupled devices (CCD) chips in the line direction X each having thousands of CCD elements and is operable to read the image of the printed board 11 for each pixel. The image data thus obtained are transmitted to binalization circuits 21a and 21b. The binarization circuits 21a and 21b generate a hole image original signal $HIS_O$ and a pattern image original signal $PIS_O$, respectively, both of which will be described later. The signals $HIS_O$ and $PIS_O$ are delivered to a through hole inspecting circuitry 30.

The through hole inspecting circuitry 30 has functions of detecting the positional relations between through holes and wiring patterns including lands which are formed on the printed board 11, to inform a microprocessing unit (MPU) 50 of the detection result.

The MPU 50 is operable to control respective parts of the inspection device through a control system 51. The control system I generates X-Y address signals for specifying the position on the printed board 11 corresponding to the image data which are currently transmitted to the through hole inspecting circuitry 30. The X-Y address signals are also delivered to a stage driver 52 to control a feeding mechanism which is provided on the stage driver 52 for feeding the stage 10.

A CRT 60 receives electric commands from the MPU 50 to display thereon various resulting information such as a hole image. A keyboard 70 is employable for inputting various commands to the MPU 50.

An optional portion 80 may include a defect identifying apparatus 81, a defective board removing apparatus 82 and a defect position marking apparatus 83. The defect identifying apparatus 81 is employed for displaying an enlarged image of a detected defect on a CRT, for example, to identify the defect by the operator's eyes. The defective board removing apparatus 82 is operable to remove the printed board 11 to a defective board tray when a pattern defect is detected on the printed board. The defect position marking apparatus 83 is provided to make a mark at the defect position of the printed board 11, or alternatively, at the corresponding position on a marking sheet. These apparatuses are optional.

(A-2) Optical System for Image Reading

Figure 6:
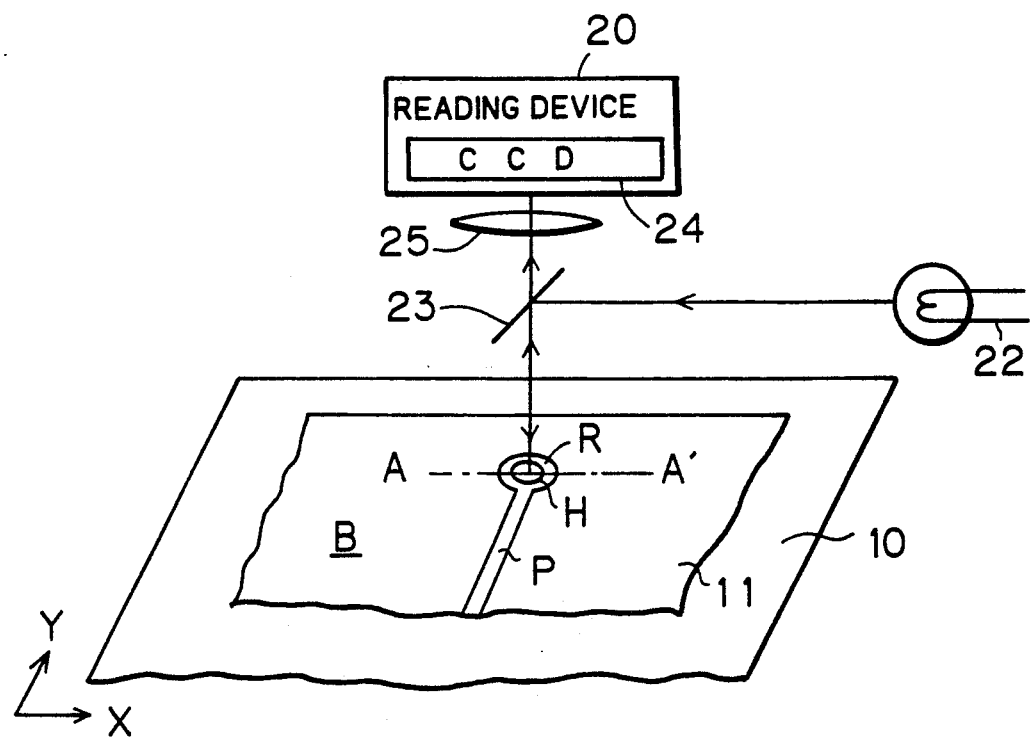
FIG. 6 illustrates an optical system for image reading.

FIG. 6 illustrate an optical system having the stage 10 and the image reading device 20 shown in FIG. 5, which is provided for reading the image of the printed board 11.

Referring to FIG. 6, a light from a light source 22 is reflected at a half mirror 23 to reach the printed board 11 on the stage 10. The printed board 11 comprises an insulating base plate B on which an electrically-conductive metal pattern is formed. The conductive pattern has a wiring pattern P and a land R in which a through hole H is provided. The light reflected at the printed board 11 passes through the half mirror 23 and a lens 25, to enter the CCD 24 provided in the reading device 20. The CCD 24 photoelectrically converts the reflected light into an electric signal for each scanning line, where the reflected light expresses the local images of the base plate B, the wiring pattern P, the through hole H and the land R on the circuit board 11 being fed in the feeding direction Y.

Figure 7:
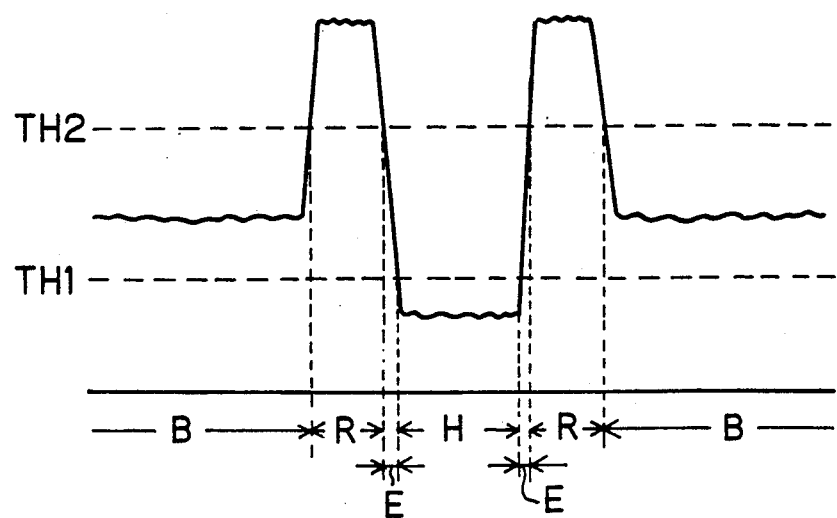
FIG. 7 illustrates the waveform of a signal obtained by the system shown in FIG. 6.
Figure 8:
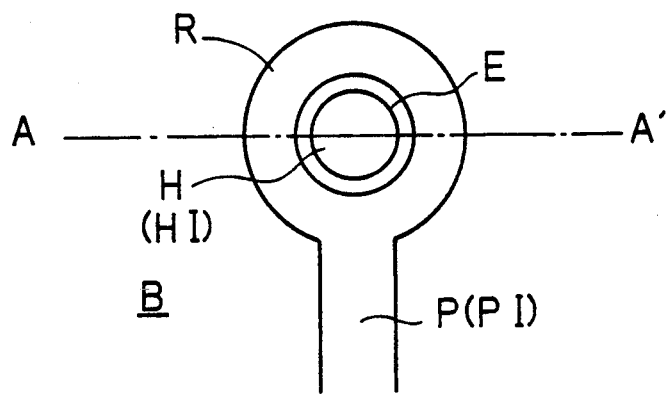
FIG. 8 illustrates a pattern which is obtained from the waveform shown in FIG. 7.

FIG. 7 is a graph showing the waveform of the signal which is obtained by reading the image along a line A—A' in FIG. 6, and FIG. 8 illustrates a pattern which is recognized by the signals obtained around the line A—A' with the system shown in FIG. 6.

As shown in FIG. 7, the intensity of the light which is reflected at the base plate B is relatively weak, and the level of the generated signal is between two threshold levels TH1 and TH2 (TH1<TH2). Since the land R is made of metal, e.g., cuprum, the intensity of the light reflecting at the land R is relatively strong and the level of the generated signal exceeds the higher threshold level TH2. The same result is obtained for the wiring pattern P, because the wiring pattern P is made of the same metal with the land R. On the other hand, the light incident to the through hole H is hardly reflected and the signal has a level lower than the threshold level TH1. Furthermore, there is an opening edge E between the through hole H and the land R, which is formed in the plating process subsequent to a drilling process. This edge part includes indentations and inclinations, so that the intensify of the light which is reflected at this edge part is not constant and is between the threshold levels TH1 and TH2 in most cases.

The electric signal from the reading device 20 is binarized in the binarizing circuits 21a and 21b (FIG. 5) with the threshold levels TH1 and TH2, respectively. The binarizing circuit 21a generates a binary signal representing a hole image HI (FIG. 8) which corresponds to the hole H, while the other binarizing circuit 21b generates a binary signal representing a pattern image PI which corresponds to the land R and the wiring pattern P. These binary signals are outputted from the circuits 21a and 21b as the signals $HIS_O$ and $PIS_O$, to be further processed in the through hole inspecting circuitry 30. Binary signals individually representing the base B and the edge E are not generated in the binarizing circuits 21a and 21b. The edge E can be recognized as the gap region between the land R and the hole H, and the information regarding the edge E is used in a process of finding the positional relation between the land R and the through hole H.

Figure 9:
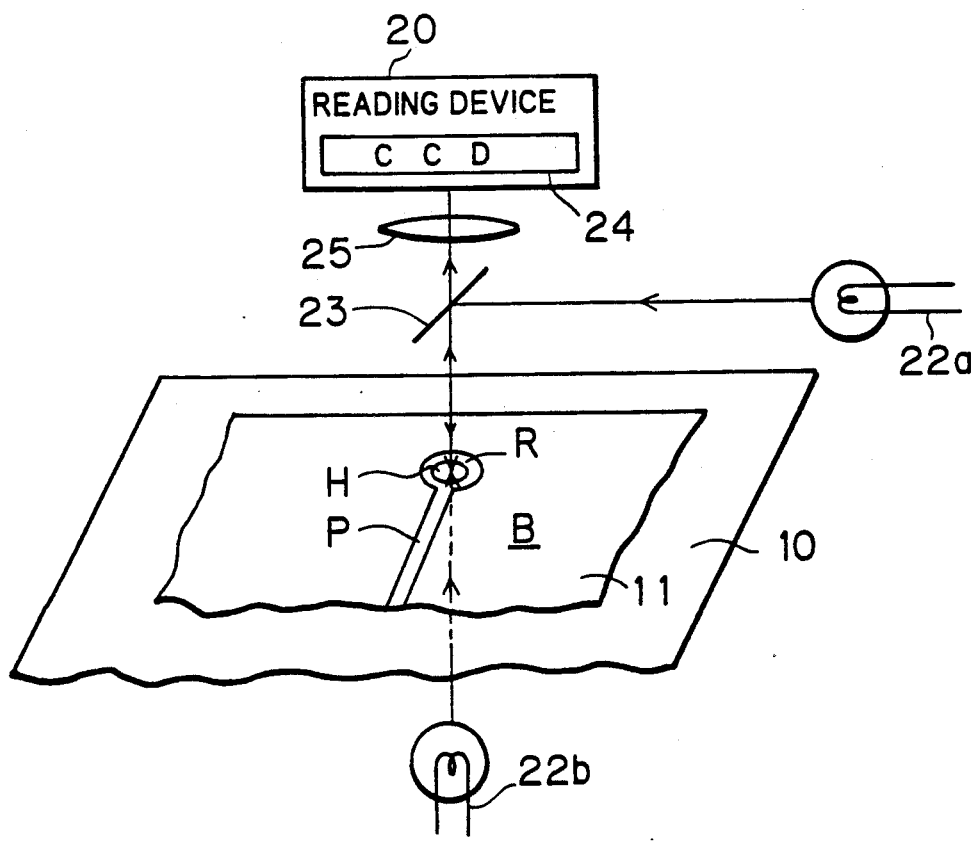
FIG. 9 illustrates another optical system for image reading.

FIG. 9 illustrates and optical system which is employable in place of the system shown in FIG. 6 Similarly to the optical system shown in FIG. 6, a light from a light source 22a is reflected by the printed board 11 and then reaches the CCD 24 in the reading device 20 through the half mirror 23 and the lens 25. The optical system shown in FIG. 9 further comprises another light source 22b below the stage 10, and a light from the light source 22b enters the CCD 24 through the hole H. Accordingly, the electric signal which is obtained from the CCD 24 has a waveform whose level is maximal at the through hole H, is intermediate at the land R and the wiring pattern P. and is relatively low at the base B and edge E.

The reading device 20 may comprise a plurality of CCD linear arrays, one of which is used for detecting the land R and the wiring pattern P by receiving the light from the light source 22a and another is used for detecting the through hole H by receiving the light from the light source 22b. In this case, respective detection results are individually transmitted to the binarizing circuits 21a and 21b, respectively.

(A-3) Through Hole Inspecting Circuitry

Figure 10:
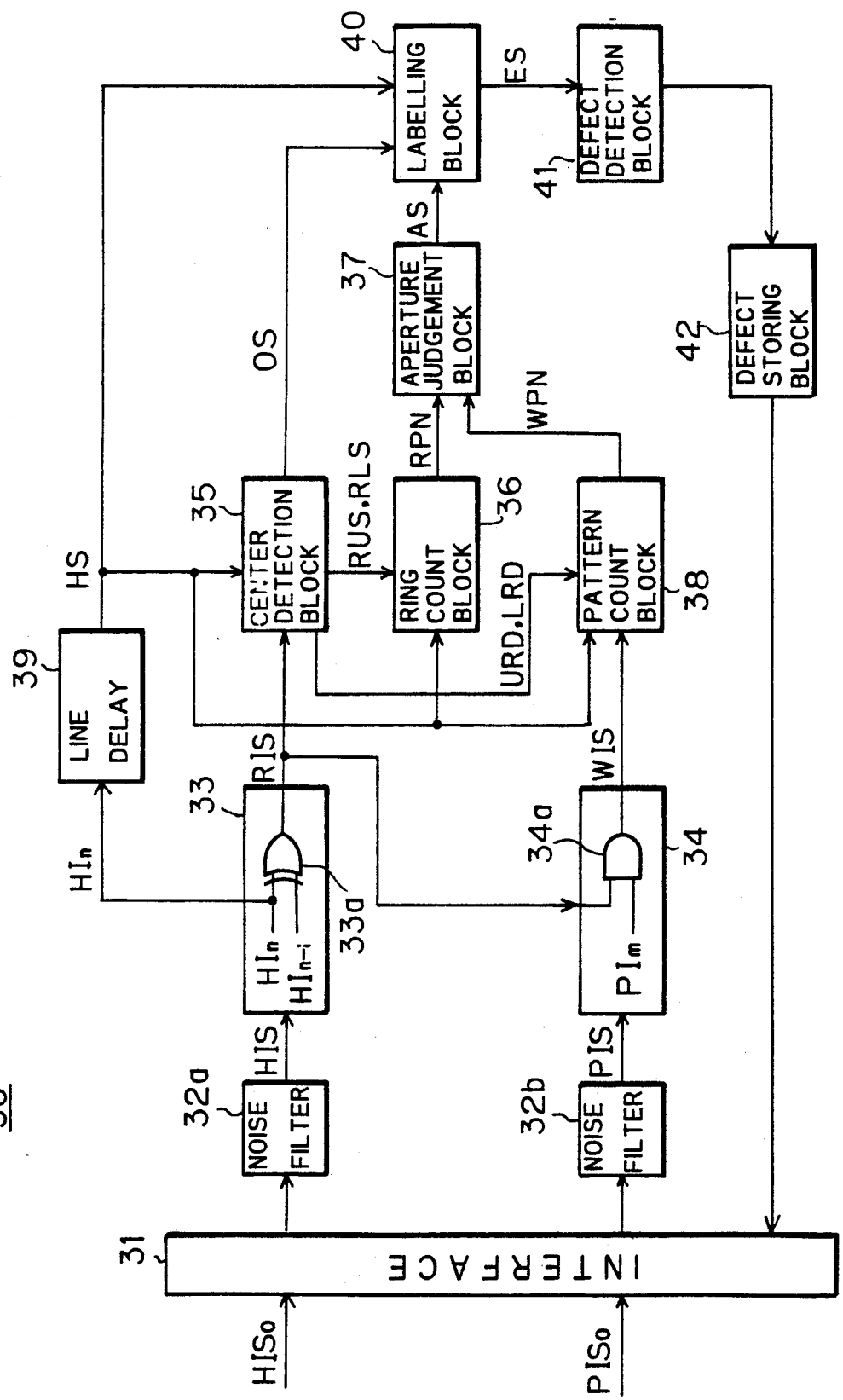
FIG. 10 is a block diagram of a through hole inspecting circuit according to the first preferred embodiment of the present invention.
Figure 11:
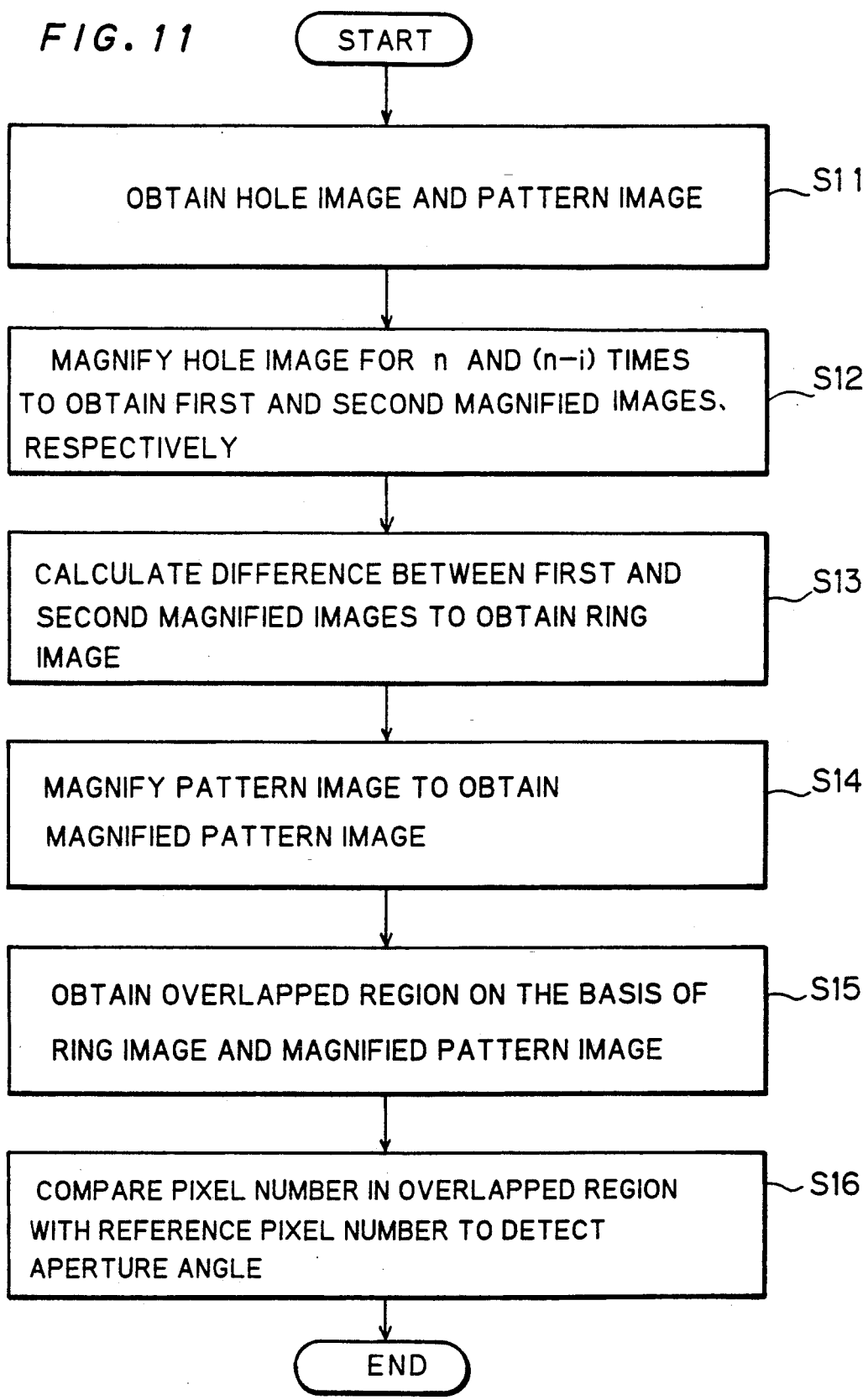
FIG. 11 is a flow chart showing the process sequence in inspecting the pattern on a printed board according to the first preferred embodiment.

FIG. 10 is a block diagram showing the internal structure of the through hole inspecting circuitry 30 of FIG. 5, while FIG. 11 is a flow chart showing a process of inspecting the printed board which is conducted in the circuit shown in FIG. 10.

The hole image original signal $HIS_O$ and the pattern image signal $PIS_O$ which are generated in the binarizing circuits 21a and 21b of FIG. 5 are transmitted to noise filter circuits 32a and 32b through an interface circuit 31, respectively. The noise filters 32a and 32b are operable to smooth the input signals for removing noises therefrom, whereby a hole image signal HIS and a pattern image signal PIS are generated, respectively. This processing and the above-described binarization processing are shown in FIG. 11 as the process step S11.

The hole image signal HIS is delivered to a hole image magnifying block 33. On the basis of the hole image signal HIS, the hole image magnifying block 33 magnifies the initial hole image HI for and (n−i) times to generate first and second magnified hole images $HI_n$ and $HI_{n-i}$, respectively, where n and i are positive integers satisfying the condition n>i. In other words, the magnified hole images $HI_n$ and $HI_{n-i}$ are obtained by magnifying the hole images HI at different magnification factors. This magnifying process may be conducted with a spatial filter which generates a new magnified part by adding one pixel to an old magnified part in each one of up, down, right, left and diagonal directions. For example, the first magnified hole image $HI_n$ can be obtained by repeating the unit magnification process with the spatial filter for n-times. In proportion to the repetition number of the magnification process, the ratio of the defective part LP to the whole of the image HI decreases and the shape of the image becomes smoothed. This magnification process is shown in FIG. 12 as the process step S12 in FIG. 12.

Figure 12:
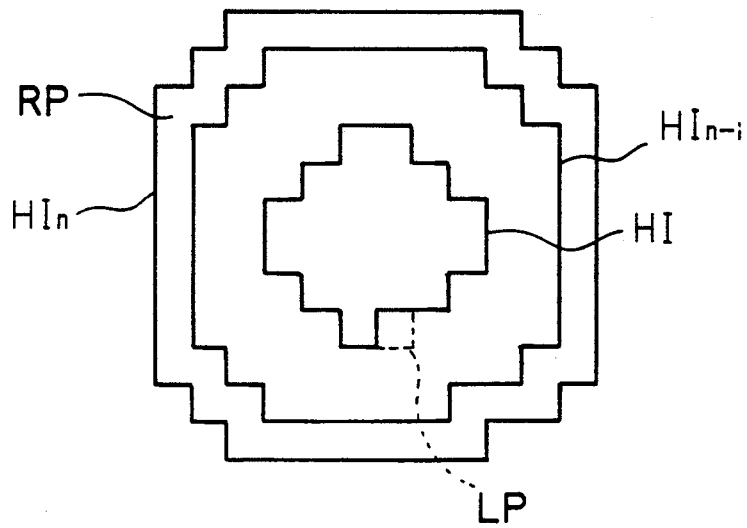
FIG. 12 illustrates magnified hole images.
Figure 13:
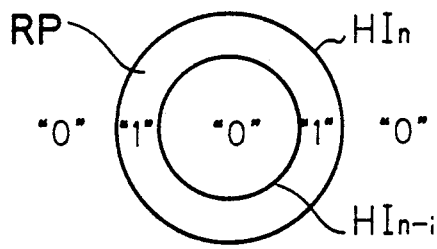
FIG. 13 illustrates a ring image.
Figure 14:
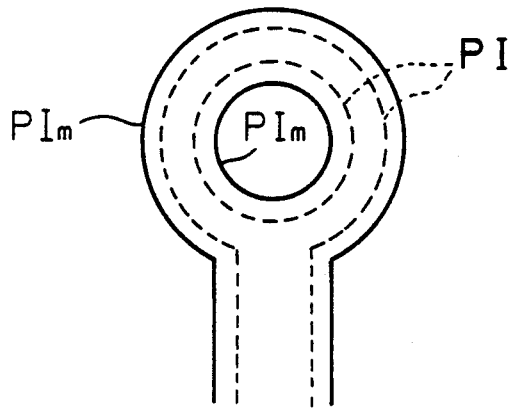
FIG. 14 illustrates a magnified pattern image.

Then, the block 33 calculates the difference between the magnified images $HI_n$ and $HI_{n-i}$ to generate an image signal representing a ring image RP shown in FIG. 12. This processing is conducted by inputting the image signals representing the first and second magnified hole images $HI_n$ and $HI_{n-i}$ for each pixel to an exclusive OR circuit 33a provided in the hole image magnifying block 33. A ring image signal RIS expressing the ring image RP is obtained at the output terminal of the exclusive OR circuit 33a. FIG. 13 schematically illustrates the shape of the ring image RP and the binarized signal levels (0,1) corresponding to the ring image RP. The number n and i can be arbitrarily designated in a software program, for example. This process of obtaining the ring image signal RIS is shown in FIG. 11 as the process step S13.

On the other hand, the pattern image signal PIS is delivered to a pattern magnifying block 34, which magnifies the initial pattern image PI represented by the pattern image signal PIS for m times to generate a magnified pattern image $PI_m$, where is a positive integer which can be designated in a software program. Similarly to the magnified hole images, defects and indentations in the pattern image PI are smoothed by the magnifying process. This processing corresponds to the process step S14 in FIG. 11.

The pattern image magnifying block 34 comprises an AND circuit 34 receiving two input signals, one of which is the ring image signal RIS transmitted from the hole image magnifying block 33 and the other is the signal representing the magnified pattern image $PI_m$. The AND circuit 34 calculates the logical product of these two input signals, to thereby generate an overlapped region image signal WIS representing the overlapped region of the ring image RP and the magnified pattern image $PI_m$.

Figure 15:
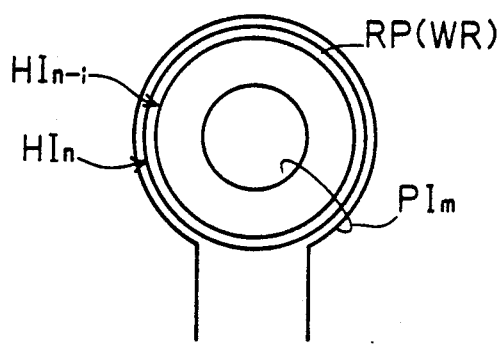
FIG. 15 illustrates an example of an overlapped region.

FIG. 15 schematically illustrates the overlapped region WR for a through hole which is formed at a normal position. The whole of the ring image RP is located within the magnified pattern image $PI_m$ and the ring image RP is coincident with the overlapped region WR. Although there is the edge region E (FIG. 8) between the through hole H and the land R as a non-binarized region, the edge region E is reduced from the inner side thereof due to the magnifying process of the hole image HI and from the outer side thereof due to the magnifying process of the pattern image PI. When the integers (n−i) and are so determined that the summation thereof is equal to or more than an expected maximum width of the edge E, the edge E disappears in the magnified images shown in FIG. 15 and there appears the overlapped region WR in place of the edge region E. This process of obtaining the overlapped region WR is shown in FIG. 11 as the process step S15.

Referring to FIG. 10 again, the ring image signal RIS is transmitted from the hole magnifying block 33 to a center detection block 35. The center detection block 35 divides the ring image into an upper ring part and a lower ring part with a trial center line of the ring image, which will be more fully described later. The division of the ring image is attained by classifying the ring image signal for respective pixels into a ring upper part signal RUS and a ring lower part signal RLS which correspond to the upper and lower ring parts, respectively. The ring upper and lower part signals RUS and RLS are inputted to a ring count block 36. The ring count block 36 counts the number of the pixels at which the signal RUS or RLS is at the logical "1" level, to thereby calculates the total number of the pixels included in the ring image RP. The total number, which will be called as "the ring pixel number PRN", is delivered to an aperture angle judgement block 37, which has a circuit structure described later.

On the other hand, the overlapped region image signal WIS which is generated in the pattern magnified block 34 is inputted to a pattern count block 38. The pattern count block 38 counts the number of pixels at which the signal WIS is at the logical "1" level, to thereby calculate the total number of the pixels included in the overlapped region WR. This total number, which is called as "the overlapping pixel number WPN", is delivered to the aperture angle judgement block 37. The calculation of the overlapping pixel number in the block 38 is conducted under the control with a ring upper part detection signal URD and a ring lower part detection signal LRD both of which are generated in the center detection block 35.

The aperture angle judgement block 37 compares the ring pixel number RPN with the overlapping pixel number WPN to detect the positional relation between the hole image HI and the pattern image PI. The detection of the positional relation may be performed by multiplying the ring pixel number RPN by a predetermined coefficient K to obtain a reference pixel number BPN and then comparing the reference pixel number BPN with the overlapped pixel number WPN.

Figure 16:
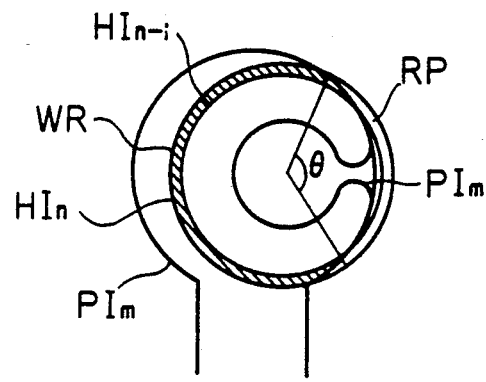
FIG. 16 illustrates another example of an overlapped region.

FIG. 16 illustrates an example of the overlapped region WR for the case where a through hole is deviated from a land. If the positional deviation is relatively large, a part of the magnified pattern image $PI_m$ breaks and a part of the ring image RP projects into the exterior of the magnified pattern $PI_m$. Consequently, the overlapping pixel number WPN is smaller than the ring pixel number RPN. Therefore, the positional relation between the through hole and the land can be detected in the form of "good (OK)" or "no-good (NG)" according to the following rules (1a) and (1b) for the coefficient K smaller than "1".

$$WPN > RPN \times K \ (=BPN) : OK \quad (1a)$$

$$WPN \leq RPN \times K \ (=BPN) : NG \quad (1b)$$

The rules (1a) and (1b) are equivalent to the following rules (1c) and (1d).

$$WPN/PRN > K : OK \quad (1c)$$

$$WPN/PRN \leq K : NG \quad (1d)$$

The detection of the positional relation implies the detection of the aperture angle $\theta$ (FIG. 16). That is, the condition (1a) is satisfied for relatively small values of the angle $\theta$, while the other condition (1b) is satisfied for relatively large values of the angle $\theta$. The aperture angle judgement block 37 is operable to compare the numbers WPN and BPN with each other for generating an aperture judgement signal AS in the form of "good/no-good" (OK/NG) according to the rules (1a) and (1b). This processing corresponds to the process step S16 in FIG. 11.

Figure 17:
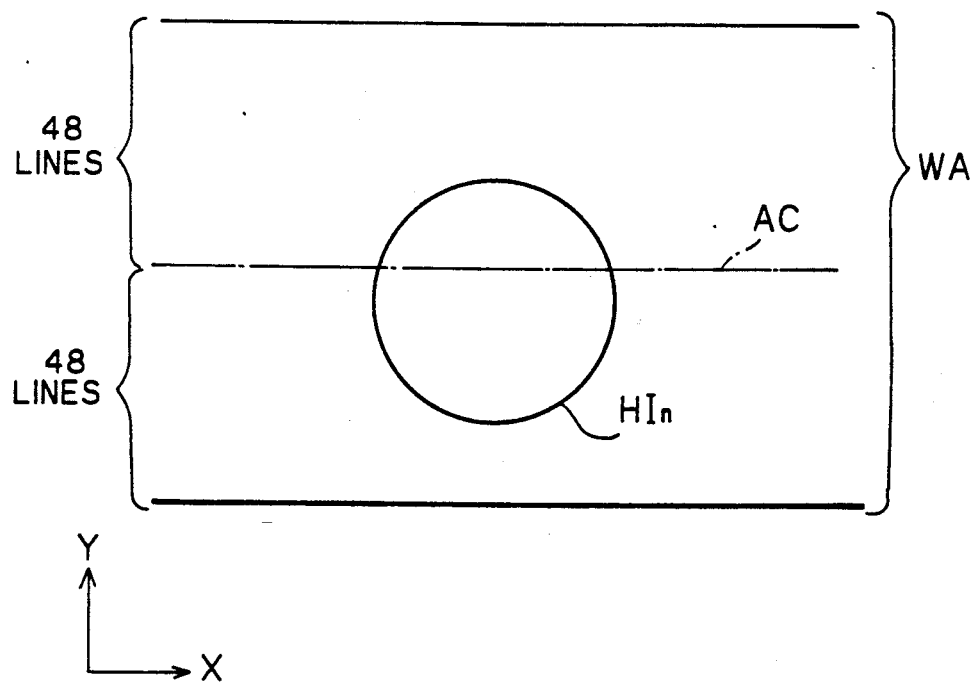
FIG. 17 illustrates a work area.

In the preferred embodiment, these processings are performed in synchronism with the image reading process. Accordingly, the respective blocks in FIG. 10 are constructed so as to conduct a real-time processing, and details thereof are as follows:

The through hole inspecting circuitry 30 comprises a line delay circuit 39, which receives the first magnified hole image $HI_n$ generated in the hole magnifying block 33. The line delay 39 stores the image data for 48 lines corresponding to the upper half of a work area WA shown in FIG. 17, for example, where each line consists of pixels corresponding to the number of the CCD elements. The stored image data are serially replaced with new line image data for each completion of image reading for one scanning line. A center line of the work area WA is assumed to be a center line AC for indicating the addresses of the area being processed. The line delay 39 generates a hole discrimination signal HS including such information.

The hole discrimination signal HS is transmitted to the center detection block 35, the ring count block 36, the pattern count block 38 and a labelling block 40. Furthermore, the coordinate value of the assumed center line AC is delivered as an address signal to the ring count block 36 and the pattern count block 38.

The center detection block 35 receives the hole descrimination signal HS and the ring image signal RIS to judge whether or not the assumed center line AC can be employed as the real center line of the magnified hole image $HI_n$. The result of the judgement is outputted to the labelling block 40 as a center line judgement signal OS. Details of the center line judgement will be more fully described later.

The labelling block 40 receives the signals OS, AS and HS, and if the aperture angle judgement signal AS indicates different detection results at respective time points in processing a same through hole, the labelling block 40 labels these data according to the labelling rule described later. The result of the labelling is transmitted to a defect detection block 41 for detecting the type, the degree and other characters of the defects in the pattern. The result of the detection is delivered to the interface 31 through a defect storing block 42, and then is transmitted to the exterior of the circuitry 30 through a bus line (not shown).

The positional relation between the through hole and the pattern is detected through the above-described process sequence.

(A-4) Circuit Structures

Figure 18:
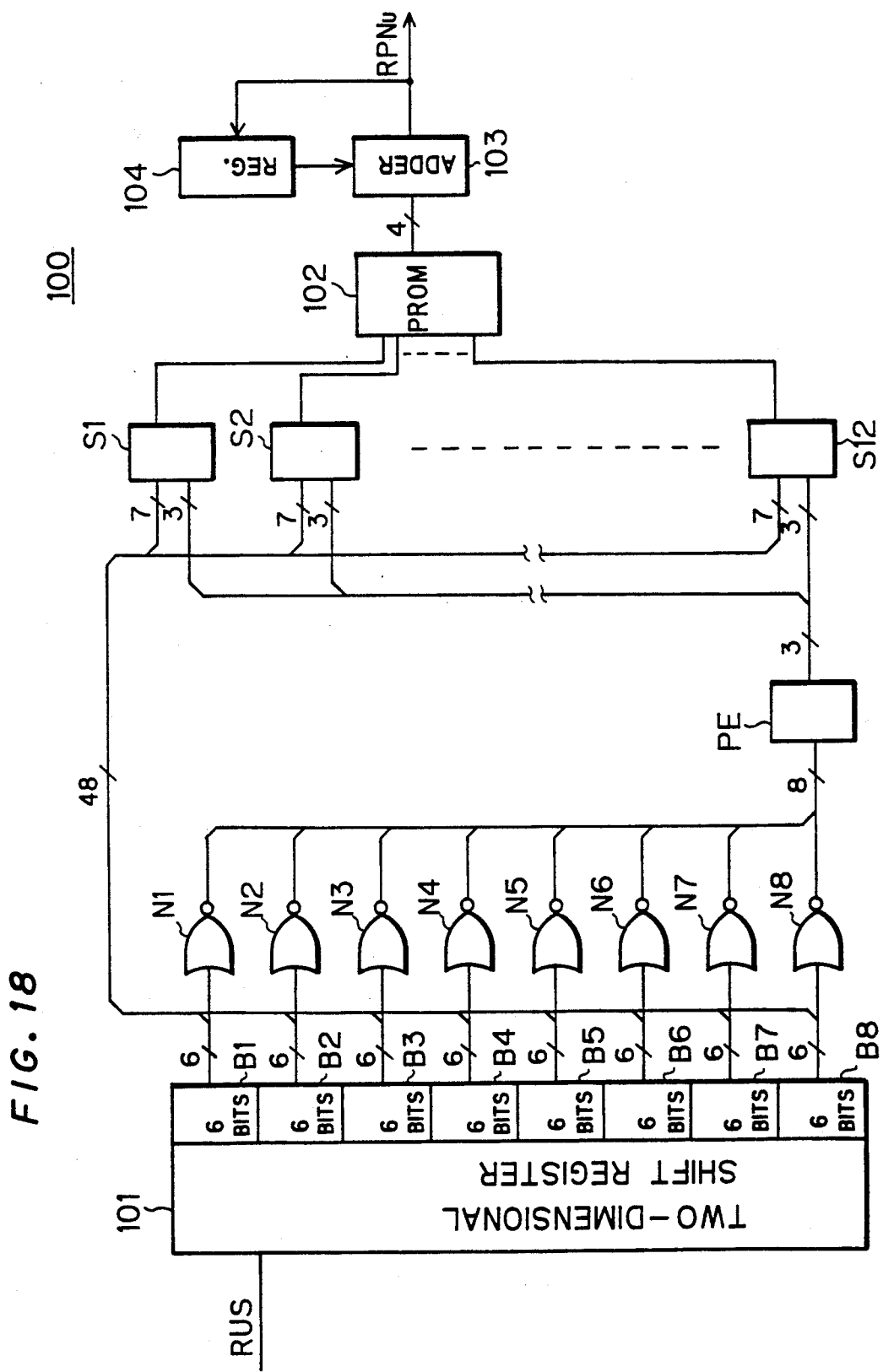
FIG. 18 is a circuit diagram of a pixel counting circuit.
Figure 19A:
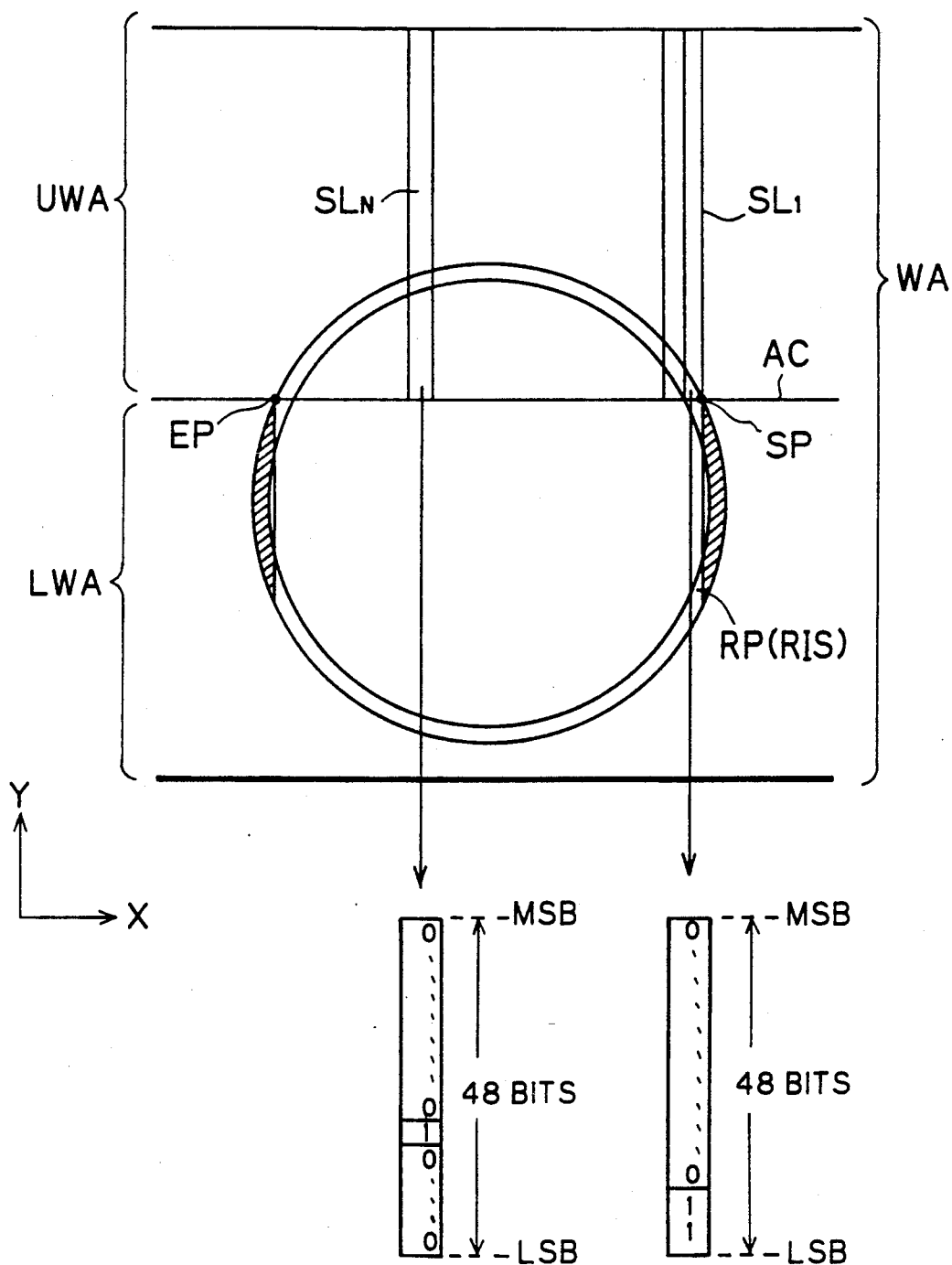
FIG. 19A illustrates slit lines and image data on the slit lines.

The circuit structures for attaining the above-described process will be now described. FIG. 18 is a circuit diagram of a pixel counting circuit which is included in the ring count block 36 of FIG. 10, while FIG. 19A illustrates the data which are employed in the circuit shown in FIG. 18.

Referring to FIG. 18, the ring upper part signal RUS is transmitted from the center detection block 35 of FIG. 10 to a two-dimensional shift register 101 which is provided in the pixel counting circuit 100. The two-dimensional shift register 101 receives the signal RUS and stores the data for an upper work area UWA (FIG. 19A) which is the upper half of the work area WA defined by the assumed center line AC. The stored data are read out from the register 101 for each slit line SL ($SL_1, \ldots, SL_N, \ldots$) which is defined by the X-coordinate value thereof. Since the area UWA has a width of 48 lines, the data on one slit line consists of 48 bits. The other half of the work area WA is a lower work area LWA, and the data on the lower work area LWA are delivered to and processed in another pixel counting circuit (not shown) which has a structure similar to that of the pixel counting circuit 100.

The respective cross points of the assumed center line AC and the ring image RP are a starting point SP and an ending point EP of the processing, respectively. For example, when the logical level in the ring image signal RIS is "1", the data on the slit line $SL_1$ is (0, ..., 0, 1, 1). On an arbitrary slit line $SL_N$, the data consists of a chain of some bits at the logical level "1" and other bits at the other logical level "0". The extraction of the ring image pixels is performed from the starting point SP to the ending point EP in each of the upper and lower work areas UWA and LWA. Consequently, in the real time processing, the number of the ring image pixels which are extracted from the work area WA increases and comes near to the real number of the pixels on the ring image as the assumed center line comes near to the real center line. In other words, when the assumed center line AC is remote from the real center line as shown in FIG. 19A, the pixel number of the ring image portions which are denoted by slant lines are incapable of being counted.

Figure 19B:
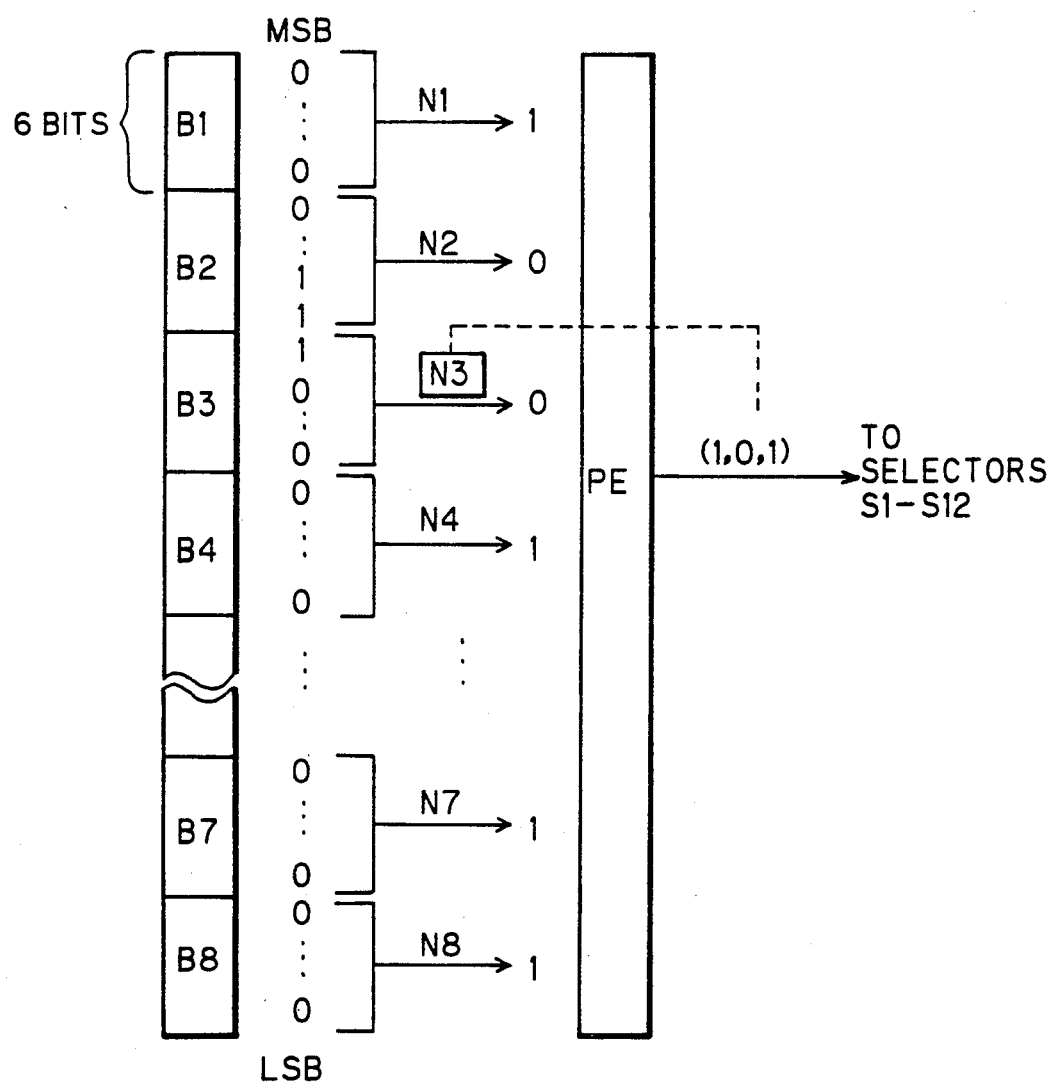
FIG. 19B and 19C illustrate an arrangement and a in FIG. 18.

The image data of 48 bits which is extracted from the work area WA for each slit line SL is divided into eight groups, which are held at blocks B1–B8 in the two-dimensional shift register 101, respectively. The block B1 holds six bits including the most significant bit MSB, while the block B8 holds six bits including the least significant bit LSB. The least significant bit LSB corresponds to the pixel on the assumed center line AC. Each of the other blocks B2–B7 also holds six bits. The left hand side of FIG. 19B schematically illustrates the state where the data:

(0, 0, ..., 0, 1, 1, 1, 0, ..., 0)

is divided and stored in the blocks B1–B8.

The respective 6 bits in the blocks B1–B8 are transmitted to NOR circuits N1–N8, respectively. Each of the NOR circuits N1–N8 generates a "0" signal if at least one bit being at "1" is included in the corresponding input consisting of 6 bits. Accordingly, the outputs of the NOR circuits N1–N8 specify one or more of the blocks B1–B8 including "1". In the example shown in FIG. 19B, the respective outputs of the NOR circuits N1–N8 are:

(1, 0, 0, 1, ..., 1)

as shown with the arrows N1–N8 in FIG. 19B. The 8 bits from the NOR circuits N1–N8 are transmitted to a priority encoder PE. The priority encoder PE detects the "0" bits within the 8 bits and specifies the least significant bit among the detected "0" bits. Then, the priority encoder PE generates a code of 3 bits indicating the NOR circuit which is outputting the specified least significant bit. In the example shown in FIG. 19B, the "0" level outputs of the NOR circuits N2 and N3 are detected, and the code of 3 bits (1, 0, 1) indicating the NOR circuit N3 is generated in the priority encoder PE. Since the least significant bit in the 48 bits output (FIG. 19B) of the blocks B1–B8 corresponds to the assumed center line AC, the "0" bit being outputted from the NOR circuit N3 is nearest to the assumed center line AC among the "0" bits included in the input of the priority encoder PE.

Figure 19C:
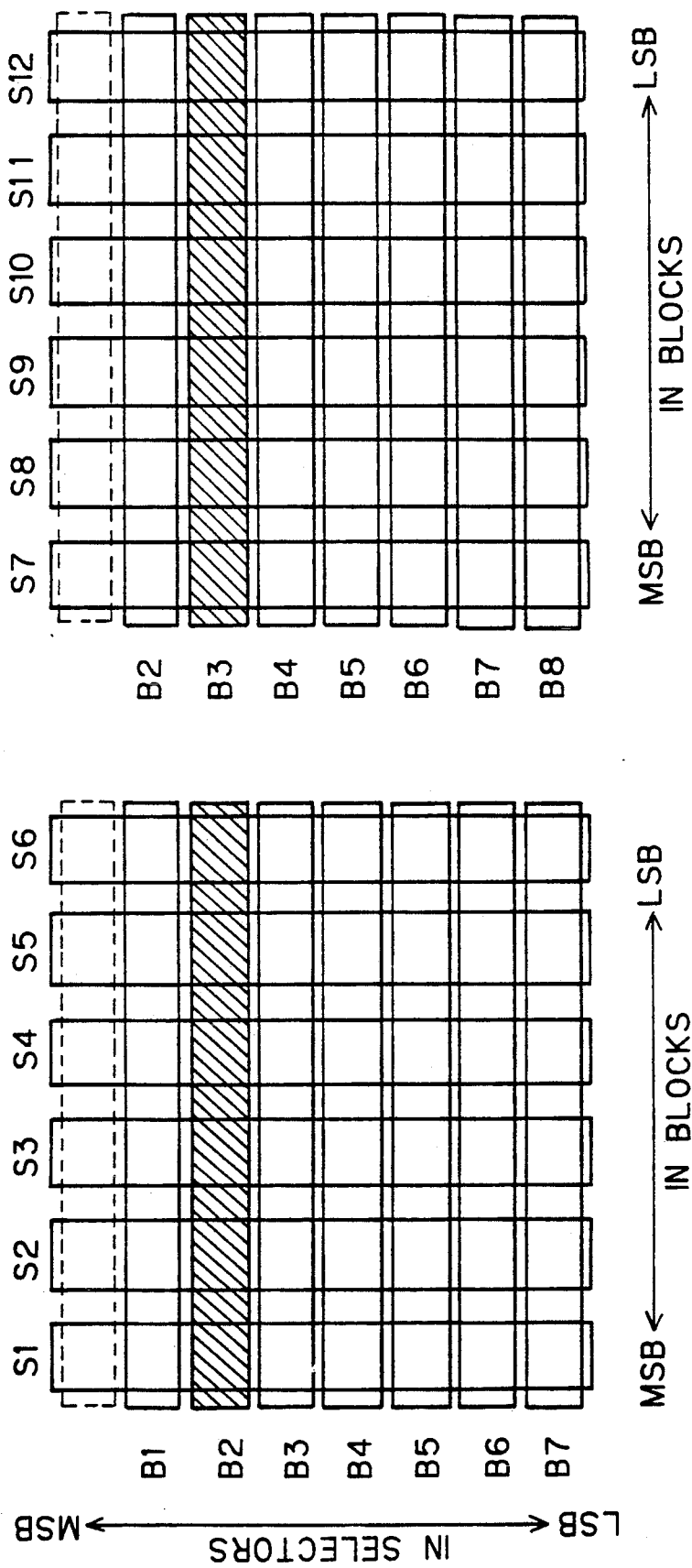

The 48 bits which are held in the blocks B1–B8 are also transmitted to twelve selectors S1–S12 according to a predetermined transmission rule, where each of the selectors S1–S12 is capable of inputting 8 bits and outputting 1 bit. The transmission rule from the blocks B1–B8 to the selectors S1–S12 is as follows:

As schematically shown in FIG. 19C, the least significant bit in the block B8 is inputted to the least significant bit of the selector S12. The other five bits in the block B8 are inputted to the respective least significant bits of the selectors S7–S11, respectively. On the other hand, the respective bits of the block B7 are inputted to the respective least significant bits of the selectors S1–S6. Similarly, the respective second least significant bits of the selectors S1–S12 receive the respective bits of the blocks B6 and B7. The remaining parts of the transmission rule can be appreciated from FIG. 19C. In the transmission rule shown in FIG. 19C, only the respective seven bits of the selectors S1–S12 are used and the respective most significant bits of the selectors S1–S12 which are indicated by the broken lines are not employed.

According to the transmission rule, twelve bits consisting of the respective six bits in the neighbouring two blocks (B2 and B3, for example) can be selected and outputted from the selectors S1–S12 when a bit order number in the selectors S1–S12 (the sixth least significant bit, for example) is designated for all of the selectors S1–S12, as shown by slanted line in FIG. 19C. The designation of the bit order number is attained by the 3 bits code signal which is outputted from the priority encoder PE. Since the 3 bits code signal indicates the block which is nearest to the assumed center line AC among the blocks having "1", the 12 bits output of the selectors S1–S12 includes one or more bits being at "1" whose number indicates the number of pixels being at "1" on the slit line being currently processed.

A programmable ROM 102 receives the 12 bits output of the selectors S1–S12 as the address signal thereof, where the 12 bits output originate in the neighboring two blocks including "1" among the blocks B1–B8. The programmable ROM 102 decodes the 12 bits input to generate a 4 bits signal representing the number of "1" included in the 12 bits input, the 4 bits input being delivered to an adder 103. An accumulation loop consisting of the adder 103 and a register 104 sequentially sums up the respective numbers of "1" included in the inputted data for the respective slit lines SL. This summation or accumlation process continues for a time period in which the slit line SL sweeps the upper work area UWA from the starting point SP to the ending point EP. As a result, the accumlation loop outputs the pixel number $RPN_U$ of the ring image RP which is included in the upper work area UWA. The pixel number of the ring image RP which is included in the lower work area LWA is also calculated by another accumulation loop (not shown) having a structure similar to that shown in FIG. 19A, where the accumulation is performed from the starting point SP to the ending point EP. The pattern count block 88 in FIG. 10 also has an accumulation loop for counting the number of pixels on the wiring pattern and the land.

(A-5) Detection of Center Position and Labelling Process

The process of specifying the address of the through hole at which the detection of the aperture angle is performed will be now described. This process includes the process step for judging whether the assumed center line coincides with the real center line of the through hole or not, which is carried out in the center detection block 35 shown in FIG. 10. The contents of the process step are as follows:

FIG. 20 illustrates the positional relation between the magnified hole image $HI_n$, the assumed center line AC and the real center line RC, while FIG. 21 shows the principle of detecting the real center line.

As shown in FIG. 20, the assumed center line AC is deviated from the real center line RC in most cases. In order to find the degree of the deviation, two lines HL perpendicular to the assumed center line AC are so provided as to pass through the respective cross points of the assumed center line AC and the magnified hole image $HI_n$. Thus, an area is defined in the magnified hole image $HI_n$ by the assumed center line AC as shown in FIG. 21, whereas an area $S_L$ by the lines HL in addition to the line AC. Then, calculated are the areas $S_U$ and $S_L$ which are included in the magnified hole image $HI_n$ between the two lines HL within the regions over and under the assumed center line AC, respectively. The difference area $S_a$ between the areas $S_U$ and $S_L$ is calculated to represent the degree of the deviation between the assumed center line AC and the real center line RC. The calculation of the difference area $S_a$ may be attained with a circuit similar to that shown in FIG. 18.

As shown in FIG. 22, a reference difference area C is defined with a minimum difference area which is expected to appear when the assumed center line AC is deviated from the real center line RC by the width of one pixel or less. The minimum difference area can be beforehand calculated from the designed diameter of the through hole and the magnification factor thereof in the image processing. If the condition $C > S_a$ is employed as a criterion for detecting the real center position, the real center position can be approximately recognized as the position of the assumed center line AC only when the assumed center line AC is just or quite close to the real center line RC. in principle. However, if there are indentations in the contour of the magnified hole image $HI_n$, the difference area $S_a$ does not become so small and it may be concluded that there are no center positions even when the assumed center line AC coincides with the real center line RC. Therefore, it is preferred that the criterion $2C \geq S_a$ or the like is employed in place of $C > S_a$ in order to certainly recognize the real center line at least one of assumed center lines provided in respective time points in the image scanning.

Next, the labelling processing in the labelling block 40 will be described. In the above-described process of detecting the center line, there is a possibility that a plurality of assumed center lines $AC_1$–$AC_3$ shown in FIG. 23 are sometimes recognized as the real center line of the magnified hole image $HI_n$. Furthermore, the respective values of the aperture angle which are detected at the assumed center lines $AC_1$–$AC_3$ may be different from each other since the starting and ending points for counting the numbers of pixels are not common to the assumed center lines $AC_1$–$AC_3$.

For example, it is supposed that the aperture angle judgement signal AS indicates "good (OK)" at the assumed center line $AC_2$ nearest to the real center position, while the signal AS indicates "no-good (NG)" at the other assumed center lines $AC_1$ and $AC_3$. In this case, only the signal indicating "good (OK)" at the assumed center line $AC_2$ is relevant to the detection of a pattern defect and the signal indicating "no-good (NG)" should be ignored, since the latter is generated at the assumed center line $AC_1$ and $AC_3$ which are deviated from the real center line RC. Consequently, it is required to employ the signal indicating "good" at the assumed center line $AC_2$ as the result of the detection. Furthermore, the data being outputted should include the information that the assumed three lines $AC_1$–$AC_3$ are detected for the same hole image HI as well as the information of good/no-good (OK/NG) which is generated at the lines $AC_1$–$AC_3$. These requirements can be satisfied by processing the signals as follows:

First, when the assumed center line $AC_1$ is recognized as the real center line through the condition $2C > S_a$, for example, the X-coordinate value of a center point $x_{c1}$ is calculated by averaging the respective X-coordinates of the starting point $x_{s1}$ and the ending point $x_{e1}$. Then, the process proceeds to the next assumed center line $AC_2$, and calculates a center point $x_{c2}$ by averaging the starting point $x_{s2}$ and the ending point $x_{e2}$ for the line $AC_2$. The X-coordinate of the center point $x_{c2}$ is compared with the respective X-coordinates of the points $x_{s1}$ and $x_{e1}$, and if the center point $x_{c2}$ is located between the points $x_{s1}$ and $x_{e1}$, it is concluded that the assumed center lines $AC_1$ and $AC_2$ are those for the same hole image HI and the data representing the coordinates of the center point $x_{c2}$ is replaced with that for the coordinates of the center point $x_{c1}$. Then, the center point $x_{c3}$ of the starting point $x_{s3}$ and the ending point $x_{e3}$ is calculated by taking the average thereof, and the same is comparing with the respective coordinates of the points $x_{s2}$ and $x_{e2}$. If the point $x_{c3}$ is located between the points $x_{s2}$ and $x_{e2}$, the X-coordinate of the point $x_{c3}$ is replaced with that of the point $x_{c1}$. On the other hand, if the center point $x_{c2}$ or $x_{c3}$ is not located between the starting point and the ending point for the previous assumed center line, such a replacement of the X-coordinate is not performed.

Through these processings, the respective coordinate data indicating the assumed center lines $AC_1$–$AC_3$ for the same image $HI_n$ are represented by that of the center point $x_{c1}$. Furthermore, the defect detection block 41 (FIG. 10) is operable to generate a good (OK) signal for the image $HI_n$ if at least one of the detection results (OK/NG) for the $AC_1$–$AC_3$ indicates "good (OK)." This processing is schematically shown in FIG. 24.

B. Modifications and Conclusion of First Preferred Embodiment

Although both of the hole image HI and the pattern image PI are magnified in the above-described example, the overlapped region WR can be obtained and the detection of the aperture angle can be attained as long as at least one of the hole image HI and the pattern image PI is magnified.

The subtraction number i for generating the ring image RP may be "2" or more, although the ring image can be obtained in the case where the number i is "1". The number of lines on the work area WA can be arbitrarily selected and the 48 lines in the embodiment is only an example thereof.

The coefficient K and the reference area C may be so changed in their values that a relatively small number of assumed center lines are detected as the real center line for a through hole having defects. In this case, it may be concluded that the through hole is no-good one (NG) when the condition (1b) is satisfied for at least one of the assumed center lines recognized as the real center line.

In the case where the printed circuit board has mounting holes other than the through holes, the respective positions, shapes and sizes of the mounting holes are beforehand inputted to the inspection apparatus, s that the mounting holes are not subjected to the inspection for defects or, even if inspected, the same are removed from the holes which are recognized as those of no-good (NG).

According to the first preferred embodiment of the present invention, indentations and inclinations in the opening edge of a through hole influencing the detection of positional discrepancy between pattern image and the through hole can be magnified by magnifying at least one of the pattern image and the hole image and detecting the overlapped region. The positional relation between the pattern and the through hole can be accurately detected by comparing the number of pixels in the overlapped region with the the reference number of pixels.

As a result, obtained is a method of inspecting the patterns on printed boards which can be applied to an automatic inspection and in which the detection of the aperture angle is accurately performed.

C. Second Preferred Embodiment

(c-1) Overall Structure and Operation

Figure 25:
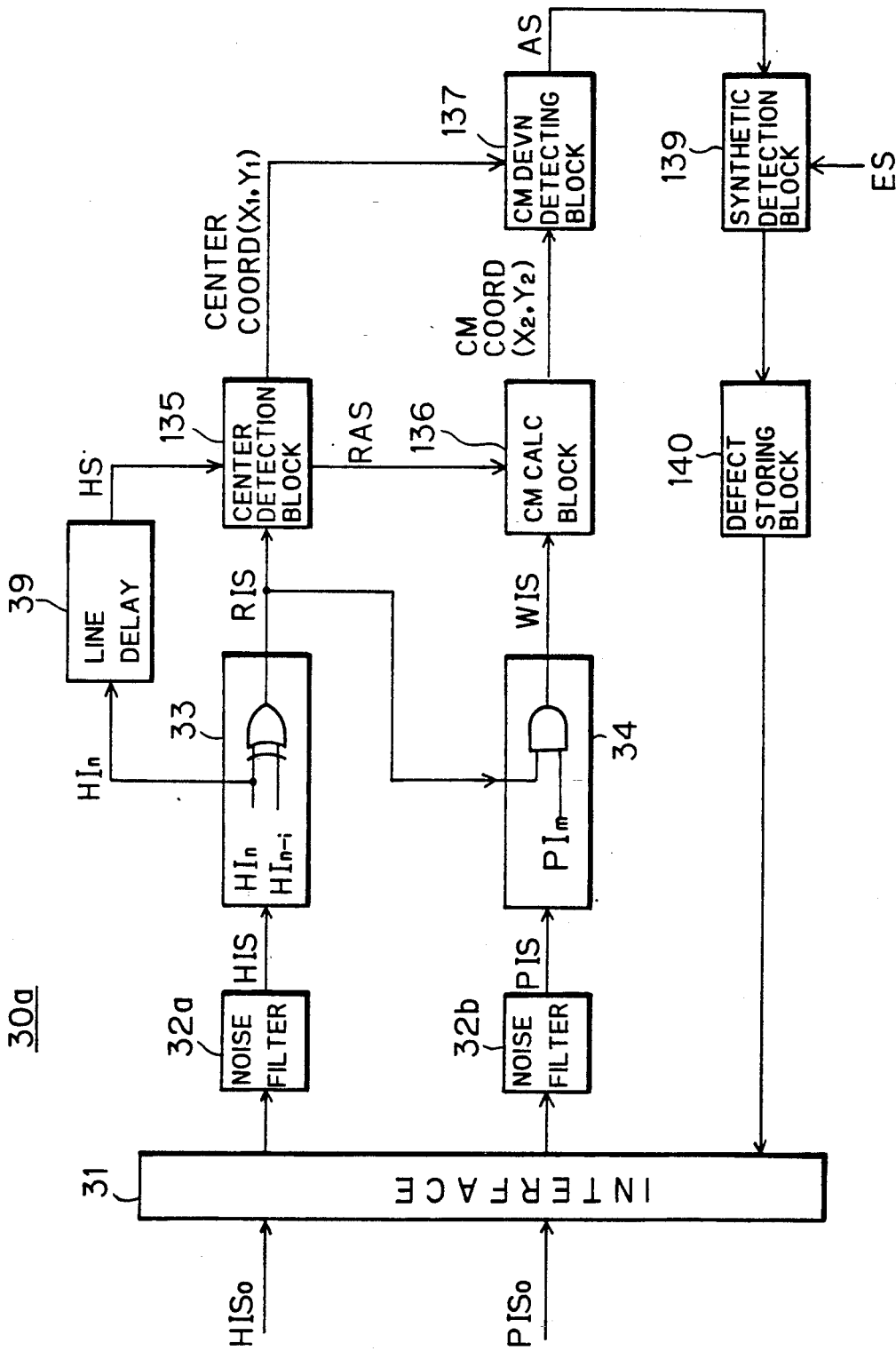
FIG. 25 is a block diagram of a through hole inspecting circuit according to a second preferred embodiment of the present invention.

An inspection device according to the second preferred embodiment of the present invention is substantially the same as that of the first preferred embodiment except for the through hole inspecting circuitry 30 (FIG. 5). That is, an through hole inspecting circuitry 30a shown in FIG. 25 is employed in the second preferred embodiment in place of the circuitry 30. Accordingly, the description in the sections (A-1) and (A-2) in this specification is also applied to the second preferred embodiment, and the same is not repeated here. The description of the second preferred embodiment will be given in the following sections only for the characteristic structure and operation thereof.

(c-2) Through Hole Inspecting Circuitry 30a

Figure 26:
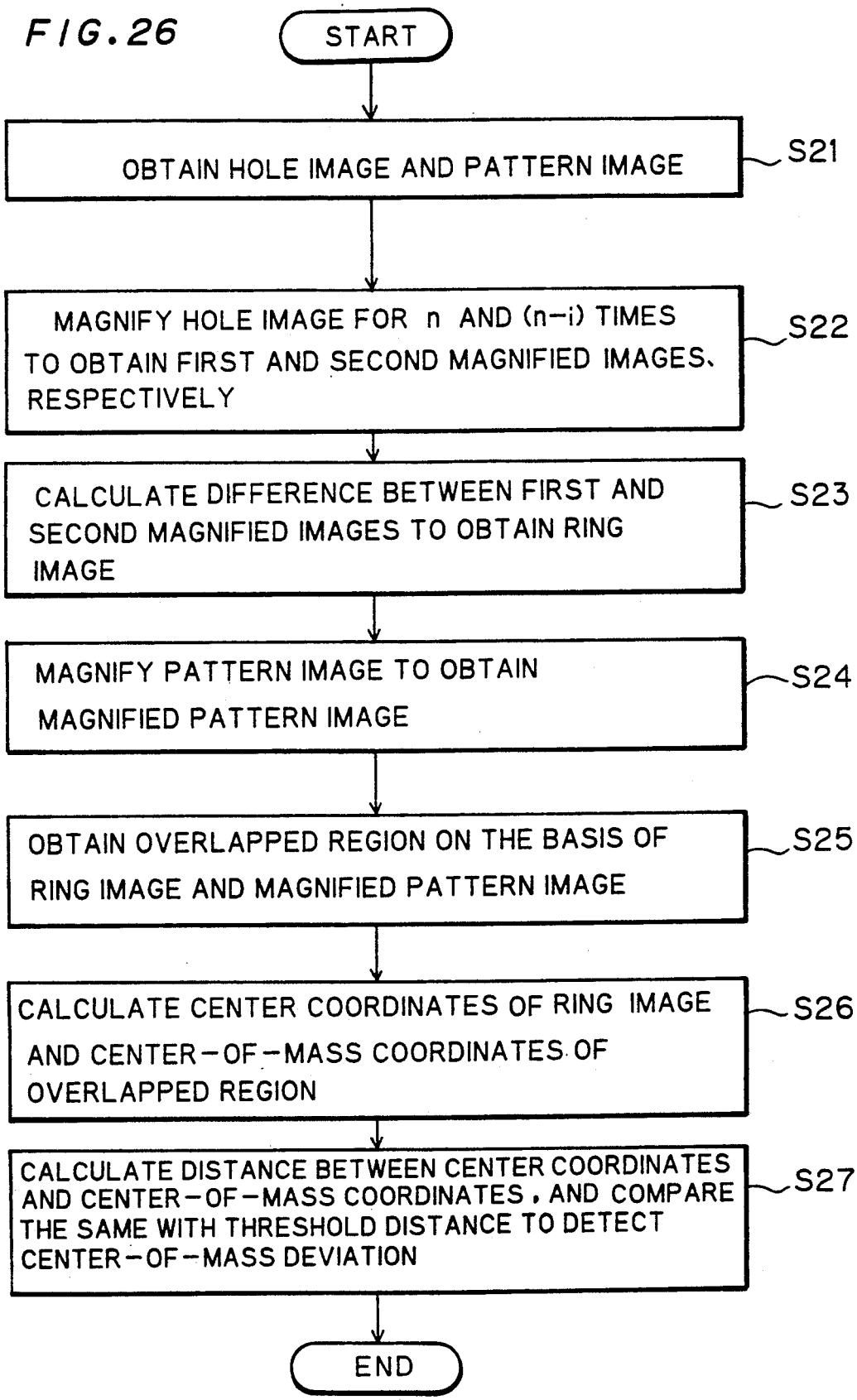
FIG. 26 is a flow chart showing the process sequence in inspecting the pattern on a printed board according to the second preferred embodiment.

The through hole inspecting circuitry 30a shown in FIG. 25 comprises an interface circuit 31, noise filters 32a and 32b, a hole image magnifying block 33, a pattern image magnifying block 34 and a line delay 39. Each of these circuits and blocks has the same structure as that in the circuitry 30 shown in FIG. 10, so that these elements operate to perform the process steps S21-S25 shown in FIG. 26, which are identical with the process steps S11-S15 shown in FIG. 11, respectively.

A center detection block 135 receives the hole discrimination signal HS and the ring image signal RIS which is generated in the hole magnifying block 33, to determine whether or not the assumed center line AC can be regarded as the real center line of the magnified hole image $HI_n$. The result of the determination or detection is delivered to a center-of-mass (CM) calculating block 136 as a ring recognizing signal RAS. The operation for detecting the center line in the center detection block 135 is similar to that in the center detection block 35 in FIG. 10.

The center detection block 135 further receives the ring image signal RIS to calculate the two cross points of the assumed center line AC and the ring image RI. The respective coordinates of the two cross points are averaged to thereby obtain the coordinates $(X_1, Y_1)$ of the center point of the ring image RI, which is illustrated in FIG. 27. The center coordinates $(X_1, Y_1)$ are transmitted to a center-of-mass deviation detecting block 137.

On the other hand, the overlapped region image signal WIS which is generated in the pattern magnifying block 34 is transmitted to the center-of-mass calculating block 136. The center-of-mass calculating block 136 calculates the coordinates $(X_2, y_2)$ of the center-of-mass of the overlapped region WR on the basis of the signal WIS, and outputs the same to the center-of-mass deviation detecting block 137 in synchronism with the ring recognizing signal RAS. The center-of-mass coordinates $(X_2, Y_2)$ are shown in FIG. 27 and are calculated through the following equations (2a) and (2b):

$$X_2 = \Sigma X_i/N \tag{2a}$$

$$Y_2 = \Sigma Y_i/N \tag{2b}$$

where N is the total number of pixels in the overlapped region WR, $X_i$ and $Y_i$ are two dimensional coordinates of the i-th pixel in the overlapped region, and the summation $\Sigma$ is that for i=1 to i=N. The origin of the two dimensional coordinate system X-Y may be arbitrarily selected. The above-indicated processing corresponds to the process step S26 in FIG. 26.

The center-of-mass deviation detecting block 137 receives the center coordinates $(X_1, Y_1)$ of the ring image RI and the center-of-mass coordinates $(X_2, Y_2)$ of the overlapped region WR, to detect the positional relation between the hole image HI and the pattern image PI through the following procedure.

First, the deviation distance d is calculated by the equation (3):

$$d = \sqrt{(X_1 - X_2)^2 + (Y_1 - Y_2)^2} \tag{3}$$

Then, the divation distance d is compared with a predetermined threshold distance D, to determine whether the positional relation is good (OK) or no-good (NG) through the conditions (4a) and (4b).

$$D > d : OK \tag{4a}$$

$$D \leq d : NG \tag{4b}$$

FIG. 27 illustrates the overlapped region WR whose center-of-mass is deviated from the center point of the ring image RI. If the deviation is relatively large, a part of the magnified pattern image $PI_m$ breaks and part of the ring image projects into the exterior of the magnified pattern $PI_m$. In such a case, the deviation distance d is larger than the threshold distance D whereby it is reconginzed that the positional relation is "no-good (NG)."

The center-of-mass deviation detection block 137 outputs a center-of-mass deviation detecting signal AS which indicates the result of the detection in the form of "good"/"no-good" (OK/NG). These processings correspond to the process step S27 in FIG. 26.

In a practical circuit structure, the image of the printed board is serially scanned for a real time processing in which the center-of-mass deviation detection is performed in parallel with the center detection using the assumed center line AC, and therefore, there is a possibility that a plurality of center coordinates $(X_1, Y_1)$ are obtained at respective time points in the image processing of a same through hole. Furthermore, different detection results may appear in the center-of-mass deviation detecting signal AS at the plurality of the center coordinates. In order to select one of the different detection results in the center-of-mass deviation detecting signal AS, the obtained data are labelled in the center-of-mass deviation detecting block 137.

The detection signal AS is transmitted to a defect synthetic detection block 39, which is operable to detect the type, the degree and the other characters of detects on the basis of a defect signal ES representing other inspection results as well as the signal AS. The inspections other than the positional discrepancy between a through hole and a wiring pattern may include an inspection for a blocking of the through hole which is performed in another inspection circuit (not shown), and the inspection results thereof are transmitted to the block 139 in the form of the defect signal ES. The result of the synthetic detection is delivered to the interface 31 through a defect storing block 140, and then, is outputted to the exterior of the circuitry 30a through a bus line (not shown).

Through the process sequence described above, the relative and positional relation between the through hole and the pattern is detected.

(c-3) Center Detection and Labelling Process

As indicated above, the center detection and the labelling process are performed in the center detection block 135 and the center-of-mass deviation detection block 137, respectively. These processings are substantially identical to those in the center detection block 35 and the labelling block 40 in FIG. 10 which are provided in the circuitry 30 according to the first preferred embodiment. Therefore, the description thereof is omitted here.

D. Modifications and Conclusion of Second Preferred Embodiment

The modifications which are indicated in the section B for the first preferred embodiment can be also applied to the second preferred embodiment. As compared with the first preferred embodiment, the second preferred embodiment has a character in that the deviation of the through hole from the wiring pattern is detected through calculation of the distance between the center of the ring image and the center-of-mass of the overlapped image. The second preferred embodiment may be modified such that respective center-of-mass positions of the ring image and the overlapped region image are calculated and the distance therebetween is compared with a predetermined threshold distance. The magnification of the hole image and/or the pattern image is also carried out in the second preferred embodiment, and therefore, the second preferred embodiment has an advantage similar to that of the first preferred embodiment.

E. Third Preferred Embodiment

(E-1) Overall Structure and Operation

FIGS. 5–9 and the description regarding the same are also applied to an inspection device according to a third preferred embodiment of the present invention. The characteristic operation of the third preferred embodiment are conducted in a through hole inspecting circuitry 30b shown in FIG. 28, which is employed in place of the circuitry 30 in FIG. 10.

(E-2) Through Hole Inspecting Circuitry 30b

Figure 28:
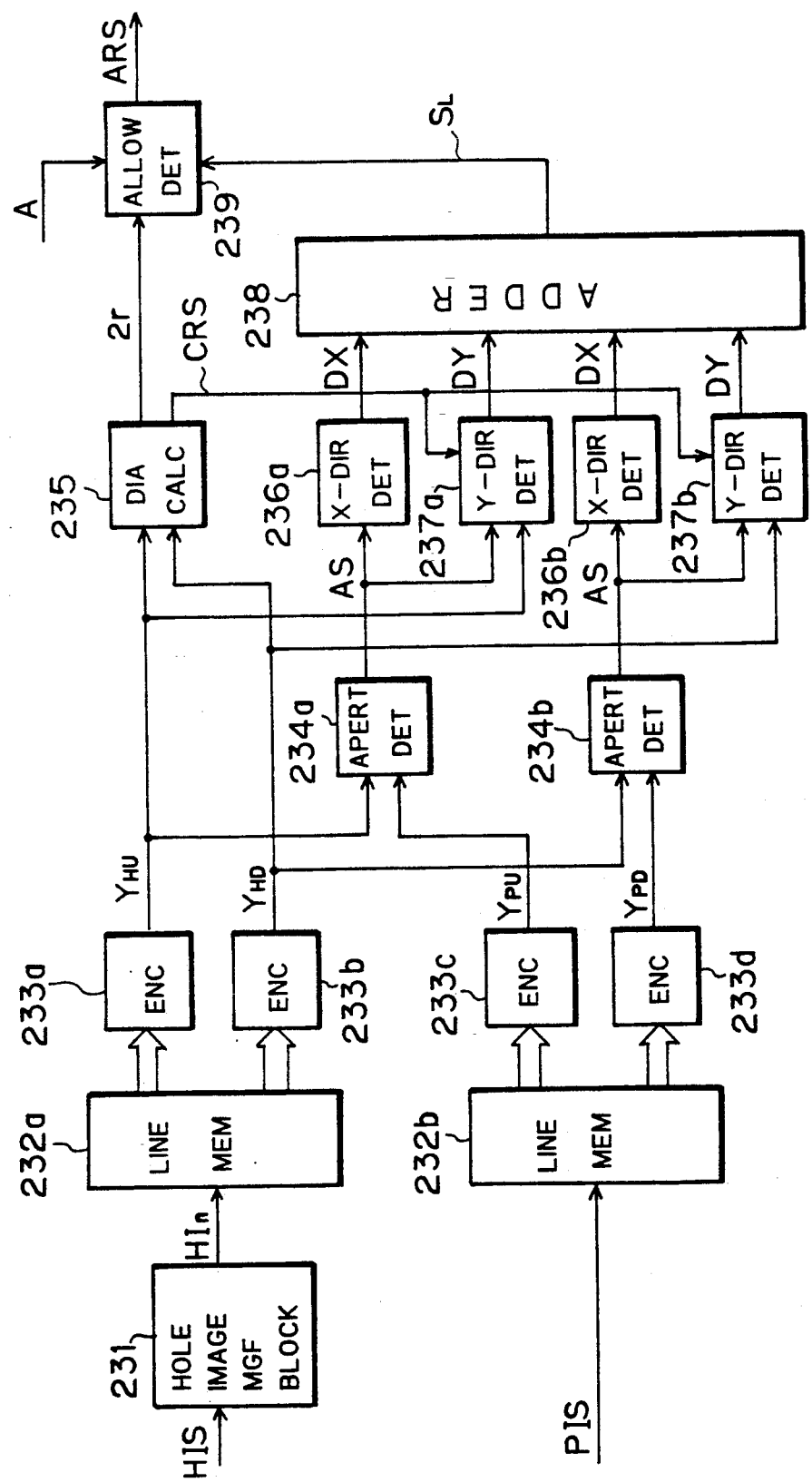
FIG. 28 is a block diagram of a through hole inspecting circuit according to a third preferred embodiment of the present invention.
Figure 29:
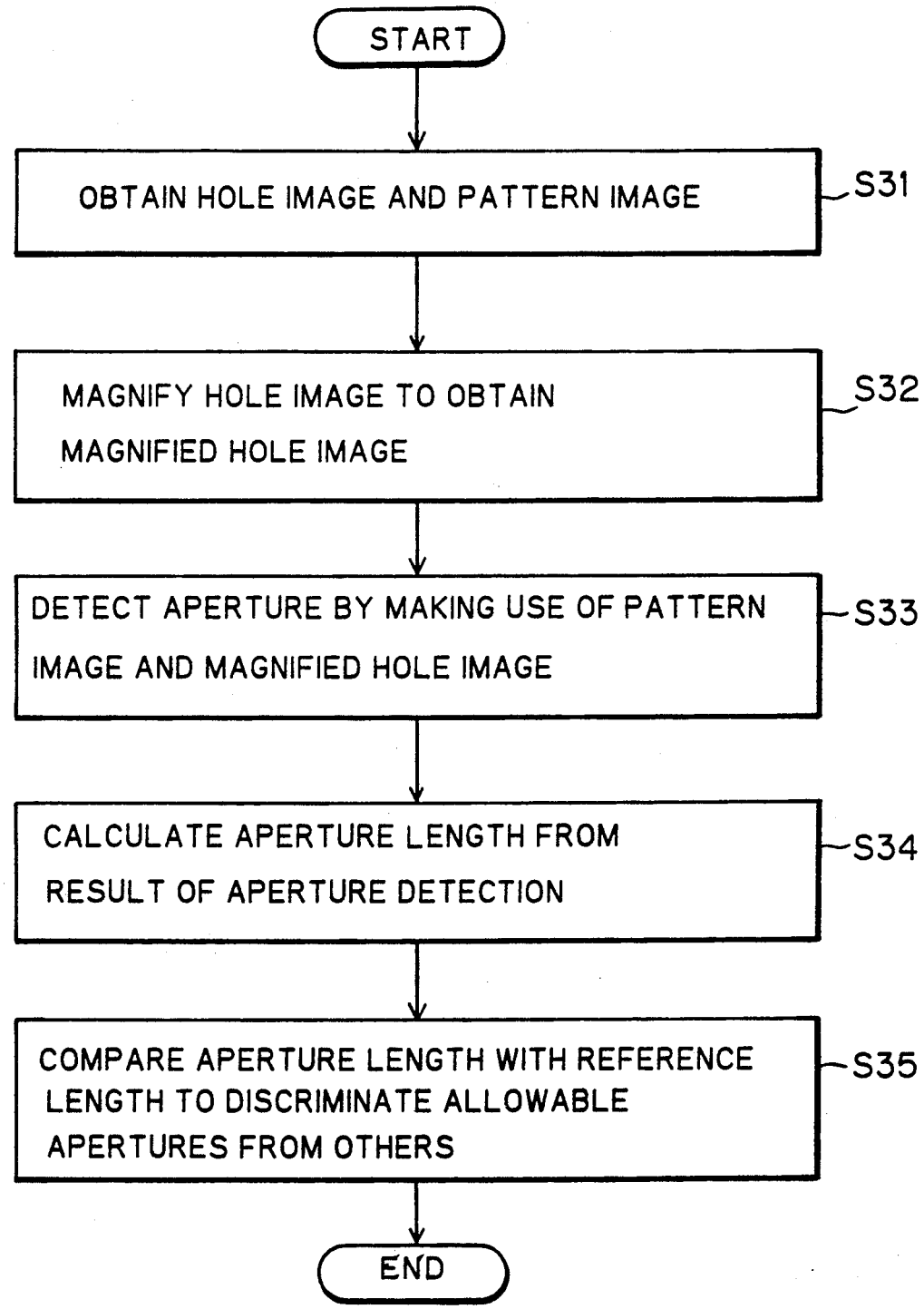
FIG. 29 is a flow chart showing the process sequence in inspecting the pattern on a printed board according to the third preferred embodiment of the present invention.

FIG. 28 is a block diagram showing the inner structure of the through hole inspecting circuitry 30b, while FIG. 29 is a flow chart showing a process sequence according to the third preferred embodiment. The through hole inspecting circuitry 30b comprises an interface circuit and a pair of noise filters (not shown in FIG. 28) at the input stage thereof. The interface and the noise filters have the same constructions with those shown in FIG. 10 as the elements 31, 32a and 32b, and a hole image signal HIS and a pattern image signal PIS are generated therein. This processing, together with binarization of the image signal in the binarization circuits 21a and 21b (FIG. 5), corresponds to the process step S 31 in FIG. 29.

The hole image signal HIS is transmitted to a hole image magnifying block 231, which has the same construction and operation with block 31 in FIG. 10. Consequently, the hole image HI is magnified for n times or by the width of n pixels, to become a magnified hole image $HI_n$. This magnification processing is shown in the process step S32 in FIG. 29.

Figure 31:
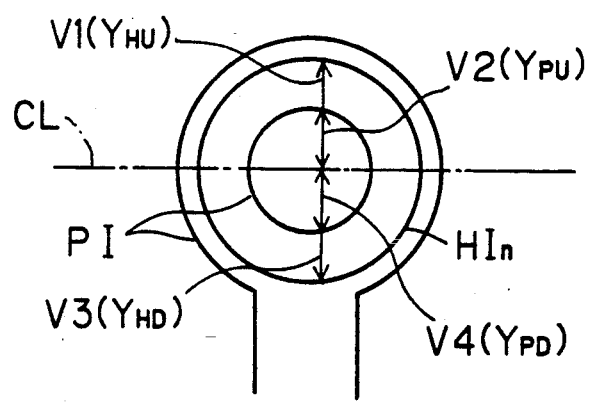
FIG. 31 illustrates a positional relation between a magnified hole image and a pattern image.

The signal representing the magnified hole image $HI_n$ and the pattern image signal PIS are inputted in line memories 232a and 232b, respectively, in which their respective two-dimensional images are stored for each scanning line. FIG. 31 illustrates the magnified hole image $HI_n$ and the pattern image PI on a common plane.

Figure 30:
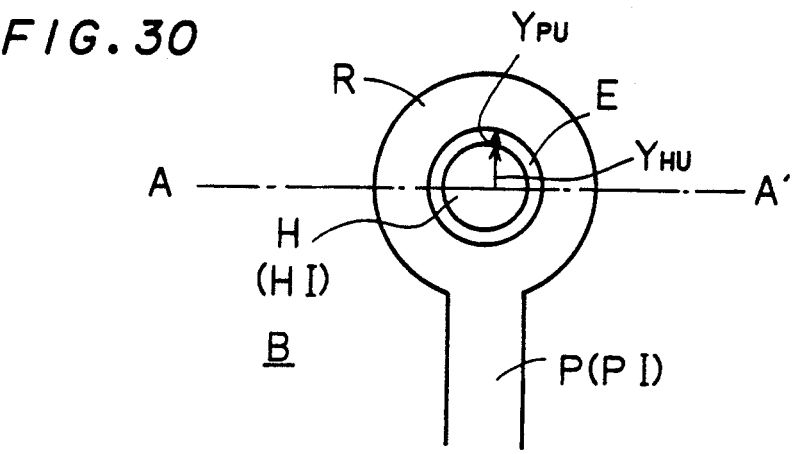
FIG. 30 illustrates a positional relation between a pattern image and a hole image.

When the hole image HI is magnified, the edge E (FIG. 30 of the hole image HI is reduced in proportion to the degree of the magnification. FIG. 30 corresponds to FIG. 8 in the first preferred embodiment. If the number n of the magnification times or magnification width is set at a value larger than the value corresponding to the expected maximum width of the edge E, the edge E disappears and the contour of the magnified hole image $HI_n$ penetrates into the pattern image PI, as shown in FIG. 31. The positional relation shown in FIG. 31 can be characterized by vectors V1–V4. The definition of the vectors V1–V4 is as follows:

The first and second vectors V1 and V2 extend in the upward direction perpendicular to the center line CL of the image. The first vector V1 has a starting point and an ending point on the center line CL and on the contour of the magnified hole image $HI_n$, respectively. The second vector V2 has the same starting point with the first vector V1, while an ending point of the vector V2 is located on the inner contour of the pattern image. The third and fourth vectors V3 and V4 extend in the downward direction and the respective starting points are same with the first and second vectors V1 and V2, respectively. The ending point of the third vector V3 is located on the contour of the magnified hole image $HI_n$, while that of the fourth vector V4 is located on the inner contour of the pattern image PI.

As understood from FIG. 31, the length $Y_{HU}$ of the first vector V1 is longer than the length $Y_{PU}$ of the second vector V2. That is, the condition $Y_{HU} > Y_{PU}$ is satisfied in FIG. 31, while the reverse condition $Y_{HU} < Y_{PU}$ is satisfied in FIG. 30 which corresponds to the images before the magnification. Similarly, the length $Y_{HD}$ of the third vector V3 is longer than the length $Y_{PD}$ of the fourth vector V4, i.e., the condition $Y_{HD} > Y_{PD}$ is satisfied in FIG. 31. Although the length $Y_{HD}$ and $Y_{PD}$ are not illustrated in FIG. 30, the reverse condition $Y_{HD} > Y_{PD}$ is satisfied before the magnification.

Therefore, the respective length $Y_{HU}$, $Y_{PU}$, $Y_{HD}$ and $Y_{PD}$ are good parameters for indicating the positional relation between the magnified hole image and the pattern image. The magnification of the hole image also contributes to correction of the indentations of the hole image HI, whereby the contour of the magnified hole image $HI_n$ is a smooth one as compared with the original hole image HI.

Figure 32:
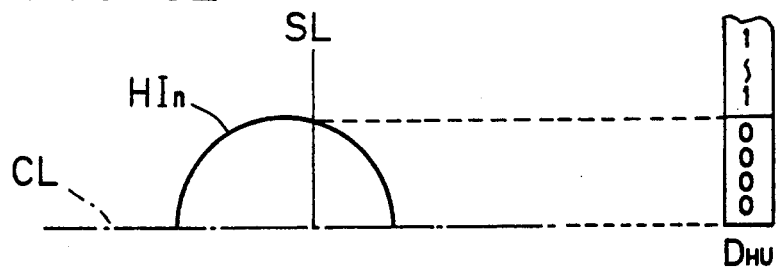
FIG. 32 illustrates the upper half of the magnified hole image shown in FIG. 31 and data values corresponding thereto.
Figure 33:
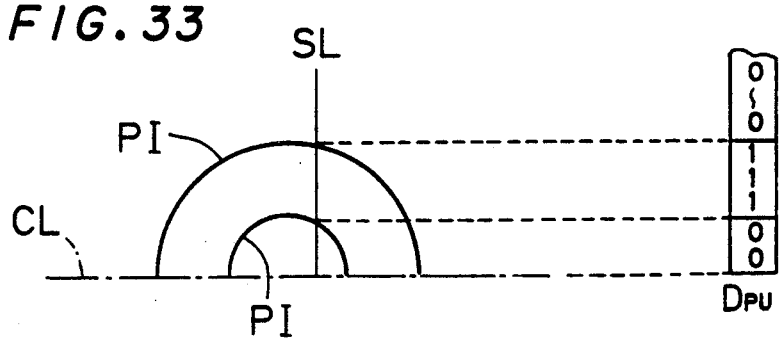
FIG. 33 illustrates the upper half of the pattern image shown in FIG. 31 and data value corresponding thereto.

FIG. 32 illustrates the upper half of the magnified hole image $HI_n$ shown in FIG. 31 and the image data corresponding thereto, while FIG. 33 illustrates the upper half of the pattern image PI shown in FIG. 31 and the image data corresponding thereto.

Referring to FIG. 32, the data value "0" indicating a black image is given to the pixels in the magnified hole image $HI_n$, while the data value "1" indicating a white image is given to the pixels in the outside of the magnified hole image $HI_n$. On the other hand, the data value "0" for a black image is given to the pixels in the outside of the pattern image PI in FIG. 33, while the data value "1" for a white image is given to the pixels in the pattern image PI. In FIG. 32 and FIG. 33, respective data arrays $D_{HU}$ and $D_{PU}$ corresponding to the magnified hole image $HI_n$ and the pattern image PI along a scanning line SL are illustrated, respectively. Data arrays $D_{HD}$ and $D_{PD}$ (not shown) corresponding to the respective lower halves of the magnified hole image $HI_n$ and the pattern image PI are also defined in a manner similar to FIGS. 32 and 33.

Incidentally, an assignment rule for assigning the data values "0" and "1" to the interior and exterior of an image can be arbitrarily selected under various conditions in the optical system for image reading such as an illumination system and those in the image processing. The following process can be employed in any type of assignment rule.

An encoder 233a shown in FIG. 28 receives the data array $D_{HU}$ representing the upper half of the magnified hole image $HI_n$ for each scanning line SL to detect the number of "0" expressing black pixels in the data array $D_{HU}$ which are continuously aligned from the center line CL along the scanning line SL. The detected number represents the length $Y_{HU}$ of the first vector V1 shown in FIG. 31, and is outputted from the encoder 223a in the form of a code signal.

Similarly, an encoder 233b receives the data array $D_{HD}$ representing the lower half of the magnified hole image $HI_n$ to detect the number of "0" which are continuously aligned for the center line CL along the scanning line SL. The detected number represents the length $Y_{HD}$ of the third vector V3 shown in FIG. 31.

Other encoders 233c and 233d receive the data arrays $D_{PU}$ and $D_{PD}$ representing the upper and lower halves of the pattern image PI for each scanning line, respectively, to detect the respective numbers of "0" which are continuously aligned for the center line CL in the upward and downward directions. The detected numbers in the encoders 233c and 233d represent the length $Y_{PU}$ and $Y_{PD}$ of the second and fourth vectors V2 and V4, and are outputted therefrom in the form of code signals. The encoders 233a–233d may be constructed by PROMs.

The length signals $Y_{HU}$ and $Y_{PU}$ which are generated in the encoders 233a and 233c are delivered to an aperture detector 234a while the length signals $Y_{HD}$ and $Y_{PD}$ which are generated in the encoders 233b and 233d are delivered to another aperture detector 234b. The aperture detectors 234a and 234b are operable to detect the aperture in the broken part of the pattern image through the following process.

Figure 34:
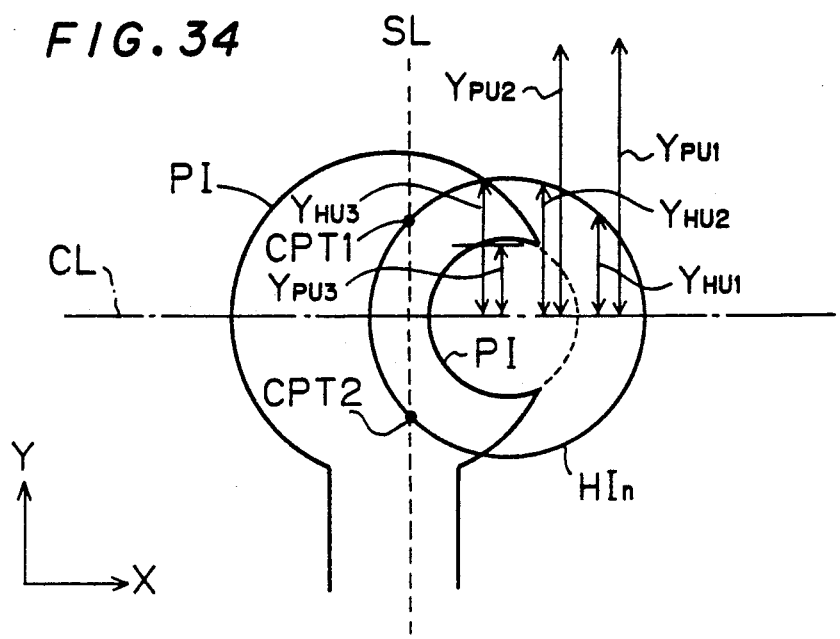
FIG. 34 illustrates a positional relation between a magnified hole image and a pattern image, which are deviated from each other in position.

FIG. 34 illustrates the positional relation between the magnified hole image $HI_n$ and the pattern image PI in the case where the respective center positions thereof are deviated from each other. If the deviation is large, a part of the pattern image PI is broken and the magnified hole image $HI_n$ projects into the exterior of the pattern image PI. The length $Y_{PU}$ is larger than the length $Y_{HU}$ in the exterior of the aperture as shown with two pairs of symbols ($Y_{PU1}$, $Y_{HU1}$) and ($Y_{PU2}$, $Y_{HU2}$), because vectors which start from the center line CL in the exterior of the aperture and extend in the upward direction never reach the inner contour of the pattern image PI. On the other hand, the normal relation between the respective positions of the images $HI_n$ and PI shown in FIG. 31 is characterized in that the condition $Y_{HU} > Y_{PU}$ is satisfied at respective positions in the part of the center line CL located in the magnified through holes $HI_n$. Accordingly, it can be determined whether each position on the center line is located in an opening part (OP or a non-opening part (CS), by generating the magnified hole image $HI_n$ and comparing the length $Y_{PU}$ with the length $Y_{HU}$. The following expressions (5a) and (5b) indicate the criterion for the determination.

$$Y_{HU} < Y_{PU} : OP \tag{5a}$$

$$Y_{HU} > Y_{PU} : CS \tag{5b}$$

As shown in FIG. 34, the conditions $Y_{HU1} < Y_{PU1}$ and $Y_{HU2} < Y_{PU2}$ are satisfied at the opening part which is the exterior of the aperture, while the condition $Y_{HU3} > Y_{PU3}$ is satisfied at the other parts in the magnified hole image $HI_n$. The upper limit of the length $Y_{PU}$, i.e., the length $Y_{PU1}$ and $Y_{PU2}$ in the opening part, is defined by the number of bits in the direction Y each of the line memories 232a and 232b can store.

The aperture detectors 234a and 234b detect the aperture or opening part for each scanning line in the upper and lower half image planes, respectively, to generate an aperture detecting signal AS indicating "opening/non-opening" (OP/CS). This process of detecting an opening corresponds to the process step S33 in FIG. 29.

A diameter calculator 235 inputs the length signal $Y_{HU}$ and $Y_{HD}$ which are generated in the encoders 233a and 233b, respectively. The diameter calculator 235 sums up the length $Y_{HU}$ on respective scanning lines to calculate the upper half area of the magnified hole image $HI_n$. The lower half area of the magnified hole image $HI_n$ is also calculated in the diameter calculator 235 by summing up the length $Y_{HD}$ on respective scanning lines. Furthermore, the diameter calculator 235 performs a center detection for detecting whether or not the center of the magnified hole image is located on the center line CL which corresponds to the center of the pixel array stored in the line memory 232a. If the former is located on the latter, he aperture length or width is calculated and it is determined whether the aperture ratio has a value in a predetermined allowable range or not.

The diameter calculator 235 further detects the X-coordinate at which a scanning line contacts the magnified hole image and at which the summation of the length $Y_{HU}$ is started. Also detected is the X-coordinate at which the summation of the length $Y_{HU}$ is ended. The diameter calculator 235 averages the detected two X-coordinates to calculate the X-coordinate of the center point of the magnified hole image $HI_n$. The Y-coordinate of the center point can be determined from the position of the center line CL.

Furthermore, the diameter calculator 235 sums up the length $Y_{HU}$ and $Y_{HD}$ to calculate the composite length $Y_{HU}+Y_{HD}$ which corresponds to the distance of two points CPT1 and CPT2 at which a current scanning line SL crosses the contour of the magnified hole image $HI_n$. The calculation of the composite length $Y_{HU}+Y_{HD}$ is performed for each scanning line. The calculated composite length $Y_{HU}+Y_{HD}$ for a current scanning line is compared with that for a preious scanning line and the longer one is selected. By repeating the procedure for the respective scanning line, the maximum one of the composite length $Y_{HU}+Y_{HD}$ is selected. The selected maximum length is held in the diameter calculator 235 as the diameter 2r of the magnified hole image $HI_n$, where r is radius of the magnified hole image $HI_n$. Alternatively, the diameter 2r may be obtained by calculating the composite length $Y_{HU}+Y_{HD}$ at the center point of the magnified hole image $HI_n$ and by defining the diameter with the calculated value. The respective data thus obtained are represented in the form of a center/diameter signal CRS and are used for calculating the aperture width as hereinafter described.

Figure 35:
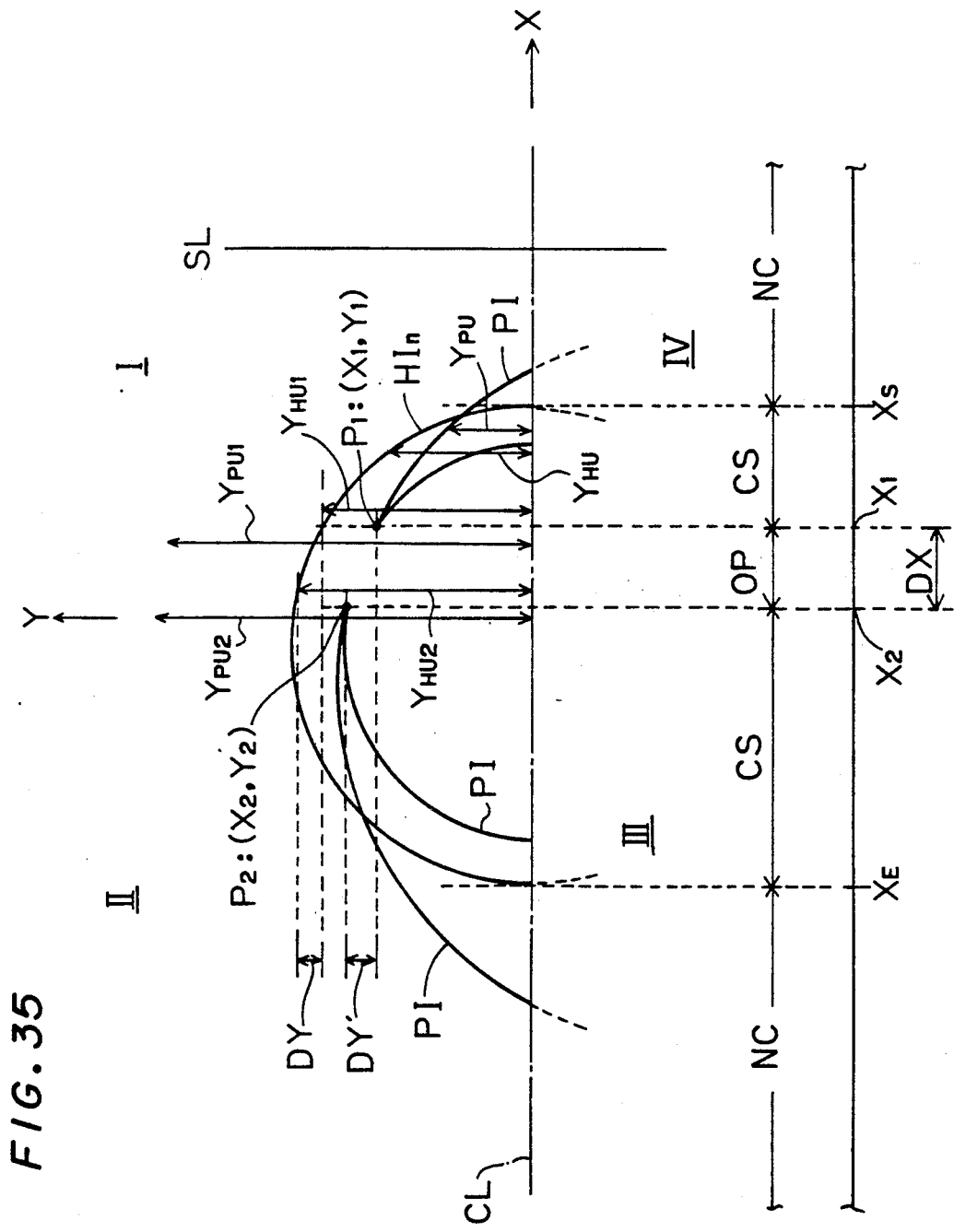
FIG. 35 illustrates an example of a situation in which an aperture length is calculated.

The construction for calculating the aperture width is as follows:

An X-directional detector 236a receives the aperture detecting signal AS from the aperture detector 234a to calculate the aperture length in the direction X. e.g., the length DX shown in FIG. 35, on the upper half plane defined by the center line CL, if at least a part of the aperture is located in the upper half plane. A Y-directional detector 237a receives the aperture detecting signal AS and the length signal $Y_{HU}$ from the aperture detector 234a and the encoder 233a, respectively, to calculate the aperture length in the direction Y, e.g., the width DY in FIG. 35, on the upper half plane. Similarly, an X-directional detector 236b inputs the aperture detecting signal AS from the aperture detector 234b to calculate the aperture length in the direction X on the lower half plane, if at least a part of the aperture is located in the lower half plane. Furthermore, a Y-directional detector 237b inputs the aperture detecting signal AS and the length signal $Y_{HD}$ to calculate the aperture length in the direction Y on the lower half plane.

FIG. 35 illustrates an example of calculating the aperture length, where only the upper parts on a pattern image PI and a magnified hole image $HI_n$ are shown. The coordinate plane is divided into the first to fourth quadrants I-IV by the X and Y axes having an origin at the center of the magnified hole image $HI_n$, and the aperture of the pattern image PI is located in the first quadrant I.

In the sections at which the scanning line does not cross the magnified hole image $HI_n$, the length $Y_{HU}$ is zero and the calculation of the aperture length is not performed. These sections are illustrated as sections NC in FIG. 35.

When the scanning line SL reaches the magnified hole image $HI_n$, the length $Y_{HU}$ comes to have a non-zero value and he aforementioned aperture detection is started. In the case where he scanning line SL moves from the right to the left in FIG. 35 for serial image processing, for example, the scanning line contacts the magnified hole image $HI_n$ at a coordinate point $X_S$ and the aperture detection is started. The condition $Y_{HU}>Y_{PU}$ is satisfied in the period from the coordinate point $X_S$ to the coordinate $X_1$ and the aperture detection signal AS indicates "non-opening (CS)."

When the scanning line SL reaches a coordinate point $X_1$, the condition $Y_{PU1}>Y_{HU1}$ becomes satisfied and the aperture detecting signal AS indicates "opening (OP)." The length $Y_{HU1}$ at the position $X_1$ is stored in a memory for the calculation of the aperture length in the direction Y, which will be more fully described later.

Then the scanning line SL reaches the coordinate point $X_2$ at which the aperture of the magnified hole image $HI_n$ terminates, the the aperture detecting signal AS indicates "non-opening (CS)" again. The length $Y_{HU2}$ at the position just before the point $X_2$ is also stored for the calculation of the aperture length in the direction Y.

The aperture length in the direction X is calculated as a function of the respective X-coordinates of the starting point and the ending point of the aperture. In the example shown in FIG. 35, the aperture detecting signal AS is indicating opening (OP) during the scanning line SL progresses from the coordinate point $X_1$ to the coordinate point $X_2$ and the length DX is calculated by counting system clock pulses (not shown) in this period.

The aperture length in the direction Y is calculated as follows: First, the length $Y_{HU1}$ at the starting point of the aperture in FIG. 85 and the length $Y_{HU2}$ at the position just before the ending point are read out from the memory. Then, the difference between the length $Y_{HU1}$ and $Y_{HU2}$ is calculated to obtain the aperture length DY in the direction Y. If $Y_{HU1}=7$ and $Y_{HU2}=9$, for example, the length in the direction Y is obtained as $DY=Y_{HU2}-Y_{HU1}=2$. Although the calculated difference has an error due to the magnification of the hole image, the error can be made small by selecting a relatively small value for n. The distance DY' in the direction Y between the respective edge points P and P2 of the aperture may be employed as the aperture length in the direction Y, since the respective values DY and DY' are approximately equal to each other.

The above-described processing is also applied to the case where an aperture is also located in the half plane under the center line CL, and in this case, respective results in the upper and half planes are summed up later.

Figure 36:
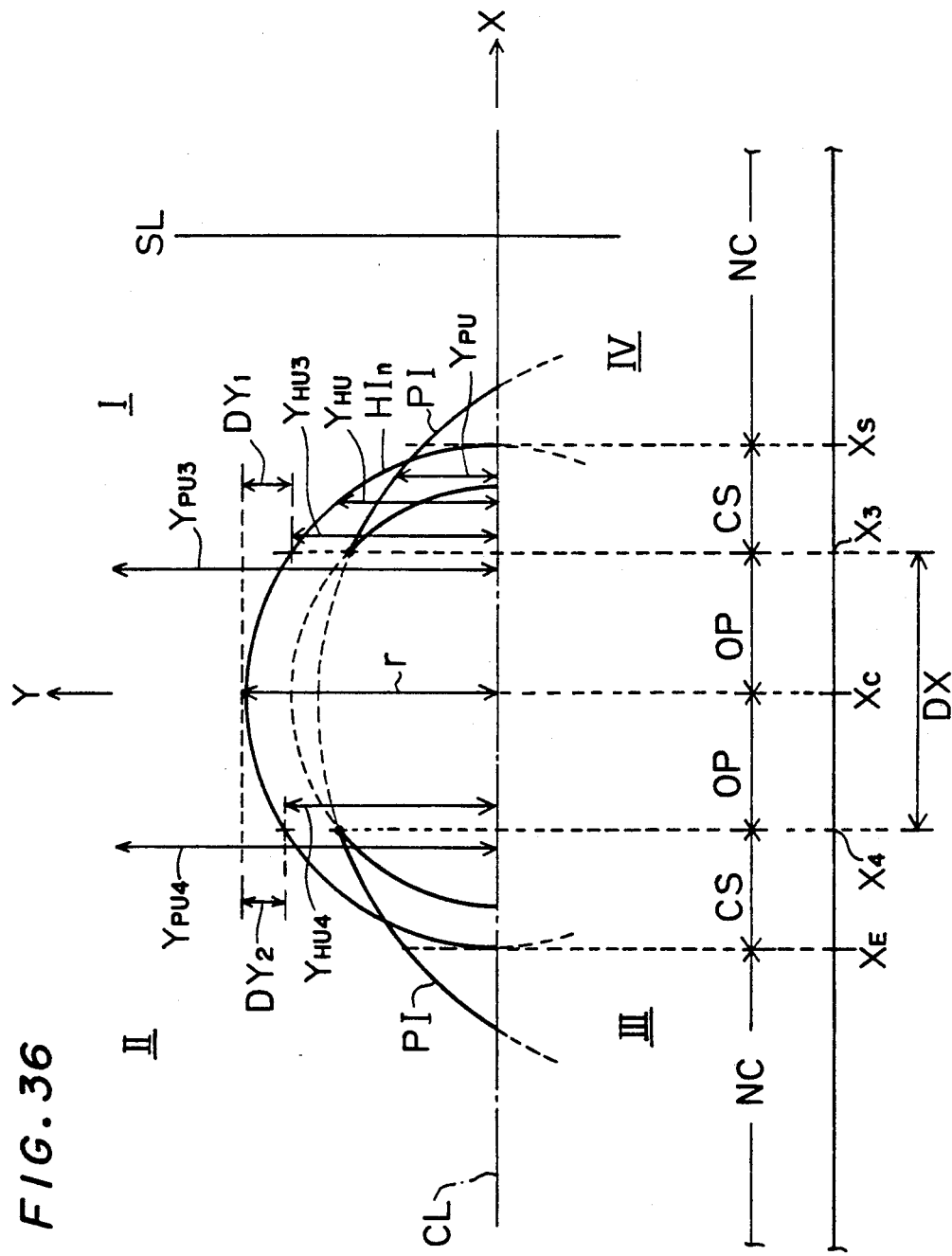
FIG. 36 illustrates another example of a situation in which an aperture length is calculated.

FIG. 36 illustrates another example for calculating the width of an aperture, where only the parts of the magnified hole image $HI_n$ and the pattern image PI are shown. In this case, the aperture extends from the first quadrant I to the second quadrant in the coordinates system X-Y. The center/diameter signal CRS is also employed in calculating the aperture length.

Similarly to the previous example, the calculation of the aperture length is not performed in the sections at which the scanning line SL does not cross the magnified hole image $HI_n$, since the length $Y_{HU}$ is zero in these sections which are illustrated as the sections NC similarly to FIG. 35.

When the scanning line SL contacts the magnified hole image $HI_n$, the length $Y_{HU}$ comes to have a non-zero value and the aperture detection is started. In the period from a coordinate point $X_S$ to a coordinate point $X_3$, the condition $Y_{HU} > Y_{PU}$ is satisfied and the aperture detecting signal AS indicates non-opening (OP). The length $Y_{HU3}$ for the point $X_3$ is stored in the memory for the calculation of the aperture length in the direction Y.

When the scanning line SL reaches a coordinate point $X_4$, the aperture is terminated and the aperture detecting signal AS resumes to indicate non-opening (CS). The length $Y_{HU4}$ at the point just before the coordinate point $X_4$ is also stored in the memory for the calculation of the aperture length in the direction Y.

Similarly to the previous example shown in FIG. 35, the aperture length DX in the direction X is calculated by counting the system clock pulses in the time period in which the scanning line runs from the coordinate point $X_3$ to a coordinate point $X_4$. The fact that the aperture extends from the first quadrant I to the second quadrant II can be recognized, since the center coordinate $X_C$ being indicated by the center/diameter signal CRS is included in the period between the coordinate points $X_3$ and $X_4$.

The aperture length in the direction Y is calculated as follows: Similarly to the previous example shown in FIG. 35, the length $Y_{HU3}$ at the starting point $X_3$ of the aperture and the length $Y_{HU4}$ at the X-position just before the ending point $X_4$ are read out from the memory. Since the aperture extends for two quadrants, the diameter value 2r of the magnified hole image $HI_n$ is extracted from the center/diameter signal CRS. Then, the difference between the radius r and the length $Y_{HU3}$ is calculated to obtain a length $DY_1$, and the difference between the radius r and the other length $Y_{HU4}$ is calculated to obtain another length $DY_2$. The respective length $DY_1$ and $DY_2$ are summed up to obtain a value DY (not shown in FIG. 36) in the direction Y.

It is to be noted that the degree of the aperture in the direction Y is well represented by the value or length DY. That is, the values $DY_1$ and $DY_2$ increase in proportion to the degree of the aperture, and therefore, the value $DY = DY_1 + DY_2$ reflects the degree of the aperture. On the other hand, the difference $DY_1 - DY_2$ is not a good parameter representing the degree of the aperture in the case where the aperture extends from the first quadrant I to the second quadrant II. This is because the values $DY_1$ and $DY_2$ have a same sign and they would partially or fully cancel each other in the subtraction $DY_1 - DY_2$. If $DY_1 = DY_2$ in FIG. 36, for example, the difference $DY_1 - DY_2$ is zero and does not represent the degree of the aperture, while the value $DY = DY_1 + DY_2$ according to the preferred embodiment is non-zero and well represents the degree of the aperture.

If $Y_{HU3} = 6$, $Y_{HU4} = 7$ and the radius $r = 10$, for example, the value of the parameter DY is:

$$DY = DY_1 + DY_2 \tag{6}$$
$$= (10 - 6) + (10 - 7)$$
$$= 7$$

The error in the calculation which is caused from the magnification of the hole image can be made small by selecting a relatively small value for the number n.

The values DX and DY which are obtained by the above-described processing are delivered to an adder 238 in FIG. 28, to be summed up therein for all of the four quadrants. The result of the summation is represented by a sum $S_L = \rho DX + \Sigma DY$. The sum $S_L$ is not rigorous width of the aperture, but is a parameter approximately representing the width. If desired, the rigorous width may be calculated from the data representing the coordinates of the edge points $P_1$ and $P_2$ and the diameter of the pattern PI. The processing of obtaining the sums $S_L$ is shown in the process step S34 in FIG. 29.

Figure 37:
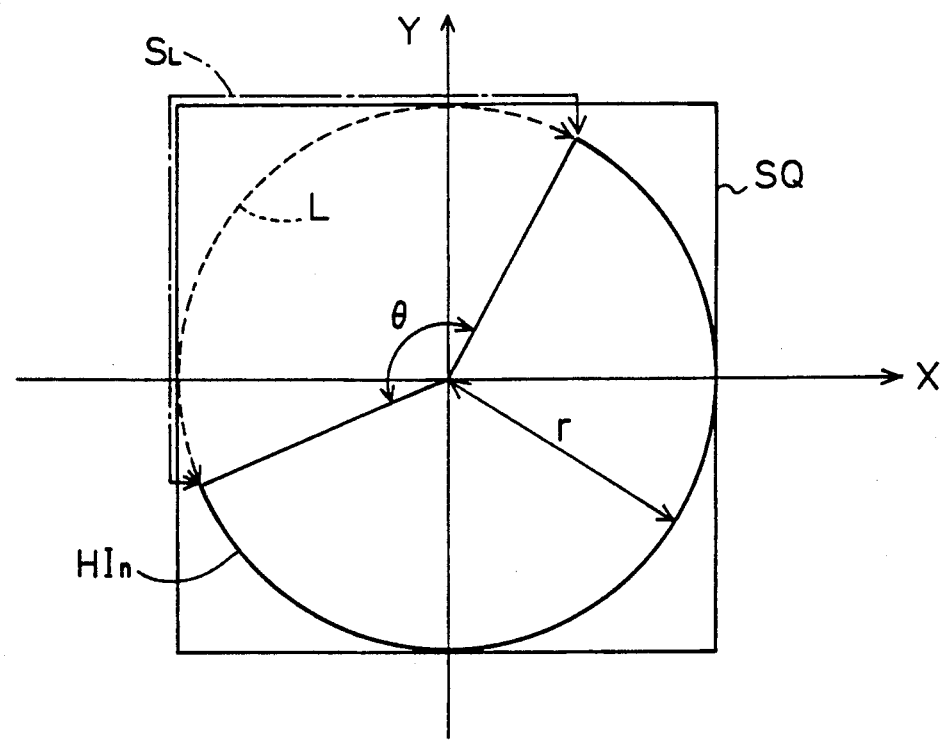
FIG. 37 illustrates an example of aperture angle judgement.

An allowable value detector 239 receives the diameter value 2r from the diameter calculator 235, the sum $S_L$ from the adder 238, and a predetermined allowable aperture ratio A from a register (not shown). The allowable value detector 239 is operable to determine whether or not the aperture ratio is smaller than the allowable aperture ratio A as follows:

First, as shown in FIG. 37, the whole circumference $\pi \times 2r$ of the magnified hole image $HI_n$ is approximated by the whole contour $4 \times 2r$ of a circumscribed square SQ, while the length of the aperture arc L is approximated by the sum $S_L$. The ratio of the aperture angle $\theta$ to the total angle 360° of the circumference is then represented as the following approximation (7).

$$\theta/360 \simeq S_L/(4 \times 2r) \tag{7}$$

The error in the aperture ratio which is caused by the approximation in the present example is smaller than 4° in the unit of angles, so that the present approximation is a practical one. Such an approximation is effective in simplifying the hardware structure of the employed circuits.

The approximate aperture ratio $SL/(4 \times 2r)$ is compared with the predetermined allowable aperture ratio A to determine whether the aperture is allowable (OK) or non-allowable (NG) through the following criteria (8a) and (8b).

$$A > S_L/(4 \times 2r) : OK \tag{8a}$$

$$A < S_L/(4 \times 2r) : NG \tag{8b}$$

If a user of the printed boards does not accept apertures having aperture angles larger than $\theta = 120°$, for example, the allowable aperture ratio A is selected as:

$$A = 120/360 = 0.33 \tag{9}$$

for the process of discriminating allowable apertures from non-allowable apertures.

The allowable value detector 239 outputs an aperture ratio discriminating signal ARS indicating the result "good/no-good (OK/NG)" of the comparison, where "good" and "no-good" correspond to "allowable" and "non-allowable", respectively.

Since the aperture ratio ($\theta/360$) of the object aperture and the allowable aperture ratio as defined by the equation (9) have a common denominator, i.e., 360°, the process of comparing the aperture ratio with the allowable aperture ratio A is equivalent to the process of comparing the aperture angle $\theta$ with the reference angle, e.g., 120°. Furthermore, the aperture angle and the reference angle are in proportion to their corresponding aperture length, respectively. Therefore, the process of comparing the aperture ratio with the allowable aperture ratio is also equivalent to the process of comparing the aperture length with the reference length corresponding to the allowable aperture ratio. Accordingly, the operation in the allowable value detector 239 can be expressed as shown in the process step S35 in FIG. 29.

The positional relation between the through hole and the pattern is detected through the sequence of the respective processings described above.

As already pointed out, the discrimination between allowable apertures and non-allowable apertures may be attained by calculating the ratio of the arc length L of the aperture to the whole circumference $\pi \times 2r$ of the magnified hole image $HI_n$ and by comparing the same with a predetermined threshold ratio without the approximation.

F. Modifications and Conclusion of Third Preferred Embodiment

The modifications which are described in the section B for the first preferred embodiment can be applied to the third preferred embodiment. Furthermore, the discrimination between allowable apertures and non-allowable apertures may be attained by calculating the distance between the edge points $P_1$ and $P_2$ (FIG. 35) as a function of their respective coordinate values $(X_1, Y_1)$ and $(X_2, Y_2)$ and by comparing the distance with a predetermined threshold length.

According to the third preferred embodiment, the aperture length is obtained by comparing the distance from the center line of the magnified hole image to the contour of the magnified hole image with the distance from the center line of image at respective positions on the center line. Therefore, the positional discrepancy between the conductive pattern and the through hole can be detected without influence from indentations and inclinations at the edges of the through hole. This advantage is also obtained under modifications in which the pattern image is magnified in place of the hole image, or alternatively, both of the hole image and the pattern image are magnified.

In particular, the process of taking the summation of the broken length of the pattern all over the circumference and of comparing the same with the whole circumference is desirable for accurately recognizing the positional relation between the conductive pattern and the through hole.

Accordingly, the third preferred embodiment is also effective in automatically inspecting the pattern on a printed board and in accurately detecting the aperture angle therein.

G. Fourth Preferred Embodiment

(G-1) Overall Structure and Operation

FIGS. 5-9 and the description regarding the same are also applied to an inspection device according to a fourth preferred embodiment of the present invention. The characteristic operation of the fourth preferred embodiment are conducted in a through hole inspecting circuitry 30c shown in FIG. 38, which is employed in place of the circuitry 30 in FIG. 10.

(G-2) Through Hole Inspecting Circuitry 30c

Figure 38:
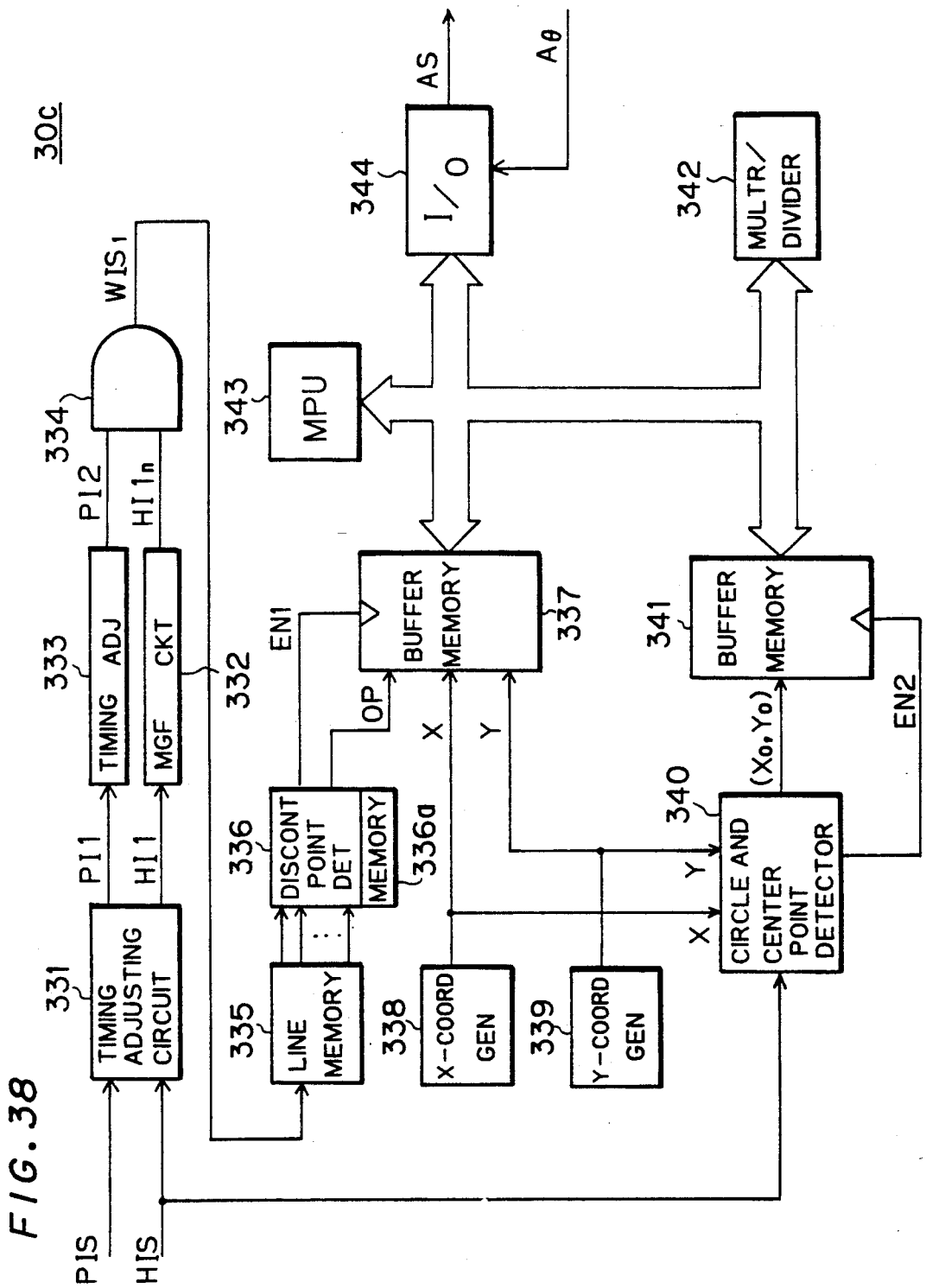
FIG. 38 is a block diagram of a through hole inspecting circuit according to a fourth preferred embodiment of the present invention.
Figure 39:
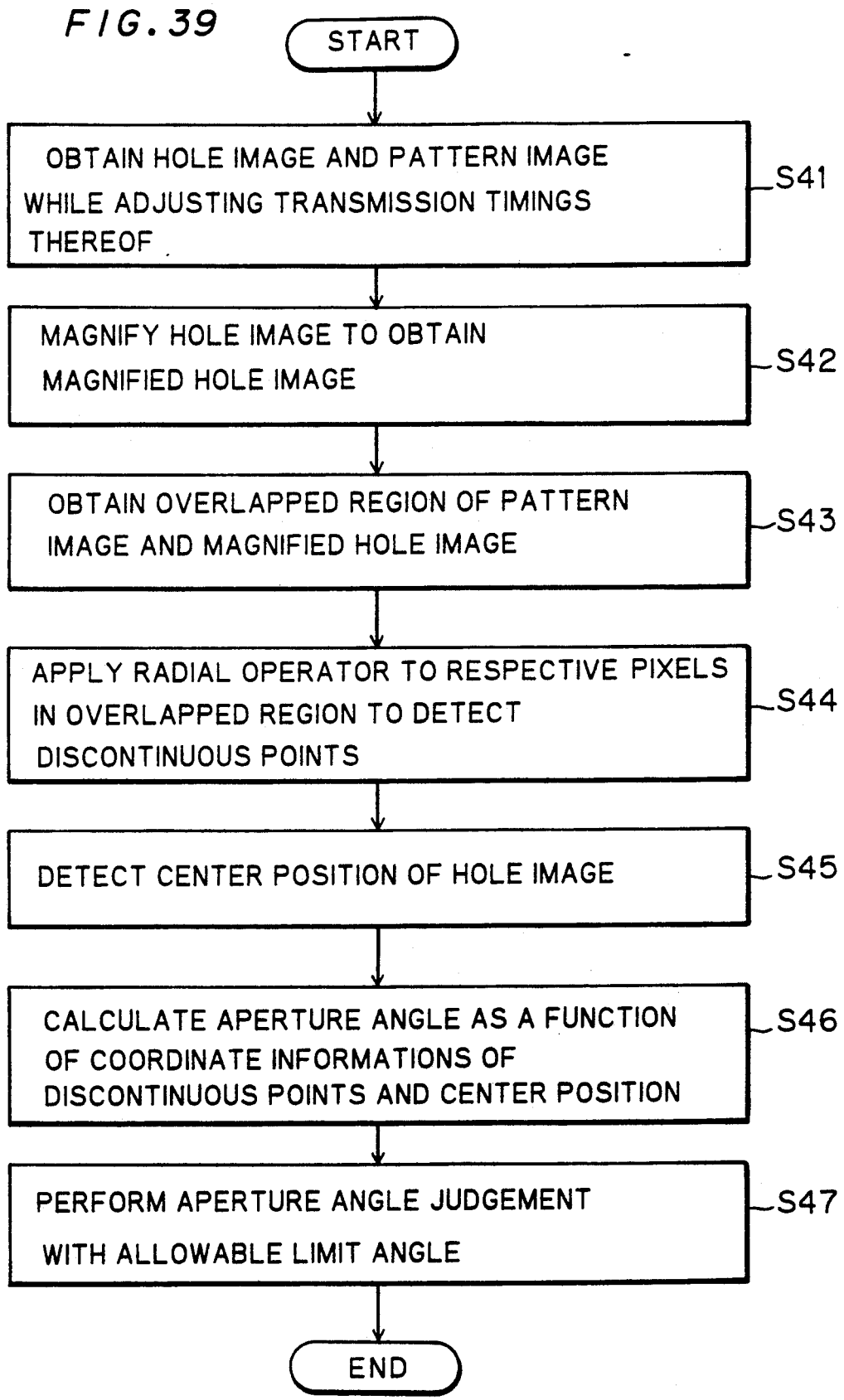
FIG. 39 is a flow chart showing the process sequence in inspecting the pattern on a printed board according to the fourth preferred embodiment of the present invention.

FIG. 38 is a block diagram showing the inner structure of the through hole inspecting circuitry 30c, while FIG. 39 is a flow chart showing a process sequence according to the fourth preferred embodiment. The through hole inspecting circuitry 30c comprises an interface circuit and a pair of noise filters (not shown in FIG. 38) at the input stage thereof. The interface and the noise filters have the same constructions with those shown in FIG. 10 as the elements 31, 32a and 32b, and a hole image signal HIS and a pattern image signal PIS are generated therein. The hole image signal HIS and the pattern image signal PIS are inputted in a timing adjusting circuit 331. The transmission timings of the signals HIS and PIS are adjusted in the circuit 331 so that the delay due to the operations for circle recognition and the like is compensated, which operations will be described later. This processing corresponds to the process step S41 in FIG. 39.

The hole image signal HI1 is transmitted to a magnifying circuit 332, which has the same construction and operation with the block 31 in FIG. 10. Consequently, the hole image HI1 is magnified for n times or by the width of n pixels, to become a magnified hole image $HI_n$. This magnification processing is shown in the process step S42 in FIG. 39.

The pattern image signal PI1 is delayed in a timing adjusting circuit 333 in order to adjust the signal transmission timing thereof to that of the magnified hole image signal $HI1_n$ which is delayed in the magnifying circuit 332 due to the magnifying process. The pattern image signal PI2 is then inputted in an AND circuit 334. The signal representing the magnified hole signal $HI1_n$ is also inputted in the AND circuit 334. The AND circuit 334 generates an overlapped region image signal $WIS_1$ representing the overlapped region on which the pattern image PI2 and the magnified hole image $HI1_n$ overlap each other.

Figure 40:
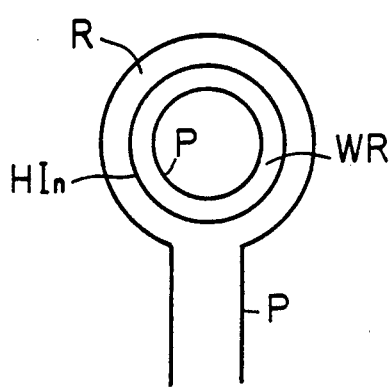
FIG. 40 schematically illustrates an overlapped region which is obtained from a normal through hole.

FIG. 40 illustrates the overlapped region for a through hole which is formed at a normal position. Although there is the edge E (FIG. 8) as a non-binarized region between the through hole H and the land R, the edge E is reduced from the inner side thereof due to the magnifying process of the hole image HI. The pattern image PI may be magnified in place of the hole image, and in this case, the edge E is reduced from the outer side thereof. When the number n of the magification times is set at a value equal to or larger than the number corrsponding to the expected maximum width of the edge E, the magnified image shown in FIG. 40 is obtained, in which the edge E disapeared and the overlapped region WR appears in place of the same.

Figure 41:
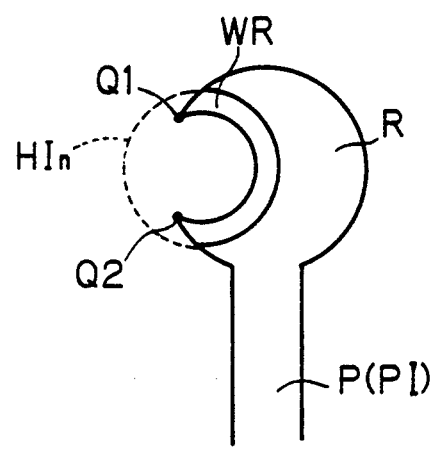
FIG. 41 schematically illustrates an overlapped region which is obtained from a through hole deviating from a normal position

FIG. 41 schematically illustrates the overlapped region for a through hole which is located at a position deviating from the land R. The overlapped region WR has a shape of an arc and has discontinuous points Q1 and Q2 due to the discrepancy between the respective positions of the through hole and the land R. These processings correspond to the process step S43 in FIG. 39.

Figure 42:
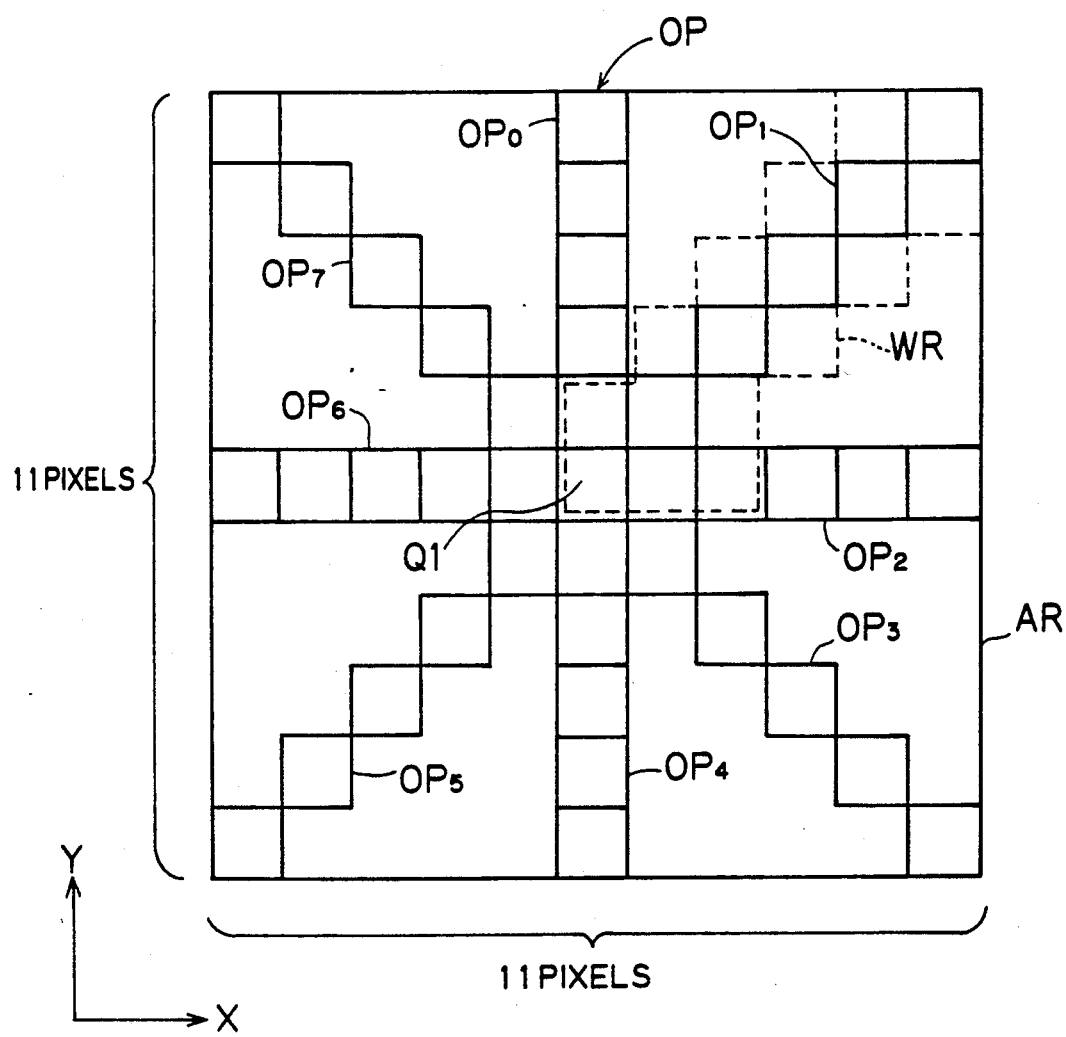
FIG. 42 illustrates a situation in which a discontinuous point is detected.

Referring to FIG. 38 again, the overlapped region image signal $WIS_1$ is transmitted to a line memory 335 and is arranged therein according to the arrangement of corresponding pixels in a two-dimensional image plane. The overlapped image data thus obtained are delivered to a discontinuous point detecting circuit 336. The discontinuous point detecting circuit 336 is operable to detect discontinuous points with a radial operator, as follows:

FIG. 42 illustrates the principle for detecting discontinuous points. The discontinuous point detecting circuit 336 (FIG. 38) comprises a memory 336a which has a memory space corresponding to an area AR shown in FIG. 42. The area AR is a pixel matrix consisting of 11×11 pixels, whose rows and columns are parallel to the line direction X and the line feeding direction Y, respectively. The image data which are transmitted from the line memory 335 are stored in the corresponding memory cells or pixels in the memory 336a. The line memory 335 and the discontinuous point detecting circuit 336 can be constructed by making use of memories having relatively small capacity, since only the memory space corresponding to the area AR is required in each of the elements 335 and 336. A radial operator OP is defined on the area AR and held in the discontinuous point detecting circuit 336. The radial operator OP consists of the eight unit operators $OP_0$–$OP_\partial$ extending in respective directions defined from 0° to 315° with a common interval 45°, for example, where the direction angles are measured from the direction Y.

In the example shown in FIG. 42, the center pixel of the area AR, which is the center of the radial operator is located at the discontinuous point Q1 which is one of the end points of the overlapped region WR, and the overlapped region WR extends along the unit operator $OP_1$. Consequently, the logical product of the overlapped region WR and the unit operator $OP_1$ has the same shape with the unit operator $OP_1$ itself, while the logical product of the overlapped region WR and the unit operator $OP_5$ extending in a reverse direction of the overlapped region WR has only the center pixel. In other words, the result of the logical-product operation is represented by a radial array of arms which includes a first arm having the logical level "1" only and a second arm having the logical level "1" at only one bit, where the second arm extends in a direction reverse to the first arm.

On the other hand, if the center pixel is deviated from the discontinuous point which is one of the end points of the overlapped region WR, the above-mentioned result is not obtained by taking he logical product of the overlapped region WR and the radial operator OP. Therefore, by taking the logical product of the overlapped image WR and the radial operator OP while serially adjusting the center pixel of the radial operator OP to the respective pixels in the overlapped image WR, positional coincidence of the center pixel and the discontinuous point can be detected and the coordinate information of the discontinuous point is recognized form the coordinate information of the center pixel being at the discontinuous point. The discontinuous point detecting circuit 336 performs this processing to detect the discontinuous points.

The radial operator OP shown in FIG. 42 is a preferred operator for the detection of discontinuous points. However, if the overlapped region WR extends in a coordinate location intermediate between that of the adjacent unit operators and therefore there is a possibility that the discontinuous points are overlooked, then a radial operator having a more number of unit operators may be employed and/or an overlapped region having a larger width may be employed. The latter can be attained by increasing the number n in the magnification of the hole image.

When a discontinuous point is detected by applying the radial operator to the pixels in the overlapped region WR, the discontinuous point detecting circuit 336 generates an enabling pulse EN1 and outputs the same to a buffer memory 337. The buffer memory 337 is supplied with the X- and Y coordinates of the center pixel of the area AR from an X-coordinate generating circuit 338 and a Y-coordinate generating circuit 339, respectively. These coordinates are serially updated so as to always indicate values of the center pixel in the two-dimensional coordinate system fixed on the image of the printed board. The buffer memory 337 fetches the values of the supplied X- and Y- coordinates in response to the enabling pulse EN1 and stores the same therein as the coordinate information for a discontinuous point, since the discontinuous point is just at the center pixel when the enabling pulse EN1 is generated.

The discontinuous point detecting circuit 336 also generates an identification code signal OP identifying the unit operator extending in parallel to the end portion of the overlapped region WR, which is inputted in the buffer memory 337 together with the enabling pulse EN1. This processing is performed all over the overlapped region WR to detect the coordinates of respective discontinuous points and to detect and the identification codes of the unit operators which extend from the respective discontinuous points along the overlapped region WR.

When the overlapped region WR shown in FIG. 41 is subjected to the discontinuous point detection, the respective coordinate informations of the discontinuous points Q1 and Q2 are detected together with the identification codes of the unit operators $OP_1$ and $OP_2$ which correspond to the points Q1 and Q2, respectively. It is recognized from the identification code of the unit operator $OP_1$ that a part of the overlapped region WR extends in the up-right direction from the discontinuous point Q1. Similarly, it is recognized from the identification code of the unit operator $OP_4$ that another part of the overlapped region WR extends in the down-right direction from the discontinuous point Q2. Through this processing, the positional relation between the discontinuous points 01 and Q2 and the overlapped region WR can be detected. The respective coordinate informations of the discontinuous points Q1 and Q2 are used for calculating the aperture angle, as described later. The above-described processing corresponds to the process step S44 in FIG. 39.

The hole image signal HIS is also delivered to a circle and center point detector 340. The detector 340 receives X- and Y-coordinates from the X-coordinate generating circuit 338 and the Y-coordinate generating circuit 339, respectively, where the coordinates are being updated in accordance with the image scanning. The detector 340 is operable to recognize a circle corresponding to the contour of the hole image by processing the hole image signal HIS, and when the circle is detected, the detector . 340 calculates the X-coordinate $X_0$ and the Y-coordinate $Y_0$ of the center point of the circle or hole. Then, an enabling pulse EN2 is generated and transmitted to a buffer memory 341, so that the coordinates $(X_0, Y_0)$ of the center point are written in the buffer memory 341.

The recognition of a circle may be attained by the method in which the hole image is divided into two parts by each scanning line and the center line of the circle is recognized as the scanning line by which the circle is divided into two parts having same areas. The center position of the circle may be calculated by averaging respective coordinate values of the two cross points at which the scanning line crosses the circle. The diameter of the circle is the difference between the respective coordinate values of the two cross points. The details of the method of recognizing a circle and of detecting the center position are disclosed in the Japanese Patent Laying Open Gazette No. 63-15374 (1988), for example. The above-described processing corresponds to the process step S45 in FIG. 39.

Figure 43:
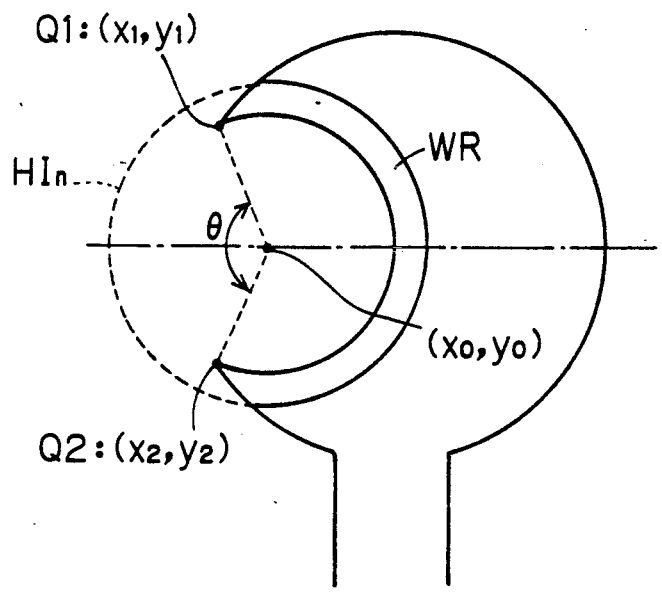
FIG. 43 illustrates a principle of calculating an aperture angle.

FIG. 43 illustrates a principle of calculating an aperture angle $\theta$. The respective coordinates $(X_1, Y_1)$ and $(X_2, Y_2)$ of the discontinuous points Q1 and Q2 which are held in the buffer memory 337 and the coordinates $(X_0, Y_0)$ of the center point which is held in the buffer memory 341 are delivered to a multiplier/divider hardware circuit 342 and a microprocessing unit (MPU) 343. The multiplier/divider 342 and the MPU 343 perform the following calculation (10a) to obtain the aperture angle $\theta$. The multiplier/divider hardware circuit 342 is provided in order to reduce the calculation load in the MPU 343 and is capable of high speed muliplication and division.

$$2 \sin(\theta/2) = \sqrt{\frac{(X_1 - X_2)^2 + (Y_1 - Y_2)^2}{(X_1 - X_0)^2 + (Y_1 - Y_0)^2}} \quad (0 \leq \theta \leq \pi) \quad (10a)$$

Whether the aperture angle $\theta$ is in the range $0 \leq \theta \leq \pi$ or not can be found before the calculation (10a) by referring to the positional relation between the center point and each of the unit operators corresponding to the discontinuous points Q1 and Q2. If it is found that the aperture angle $\theta$ is in the range $\pi < \theta$, the following equation (10a) is employed in place of the equation (10a).

$$2 \sin\{(2\pi - \theta)/2\} = \sqrt{\frac{(X_1 - X_2)^2 + (Y_1 - Y_2)^2}{(X_1 - X_0)^2 + (Y_1 - Y_0)^2}} \quad (\pi \leq \theta) \quad (10b)$$

The value of the aperture angle $\theta$ thus obtained is store in a memory. When the pattern has a plurality apertures, the respective aperture angle $\theta$ thereof are calculated and summed up to obtain a total aperture angle. These processings correspond to the process step S46 in FIG. 39.

The calculated aperture angle $\theta$ is delivered to an input/output (I/O) circuit 344. The I/O circuit 344 receives a predetermined reference angle or an allowable limit angle $A_\theta$ from a register and performs an aperture angle judgement by comparing the aperture angle $\theta$ with the reference angle $A_\theta$. When the aperture angle $\theta$ is smaller than the reference angle $A_\theta$, an aperture angle judgement signal AS indicates "good (OK)". On the other hand, when the aperture angle $\theta$ is larger than the reference angle $A_\theta$, the aperture angle judgement signal AS indicates "no-good (NG)". The center position of the through hole which is judged as "no-good(NG)" is outputted from the circuitry 30c and is displayed for visual inspection and others which are carried out after the aperture angle judgement.

The aperture angle judgement signal AS indicating good/no-good (OK/NG) is transmitted to following circuits (not shown) through the I/O circuit 344 for a process of taking away defective printed board from the inspected printed boards, for example. These processings correspond to the process step S47 in FIG. 39, and the sequence of the aperture angle judgement processes is now completed.

H. Modifications and Conclusion of Fourth Preferred Embodiment

The modifications which are described in the section B for the first preferred embodiment can be also applied to the fourth preferred embodiment. For example, the overlapped region WR may be recognized as a region on which the magnified hole image and a magnified pattern image, which is obtained by magnifying the wiring pattern image, overlap each other. Furthermore, the buffer memories 337 and 341 may be those of a First-In/First-Out (FIFO) dual port memory type, and in this case, the aperture angle judgement can be conducted in asynchronism with the image scanning of printed boards.

Figure 44:
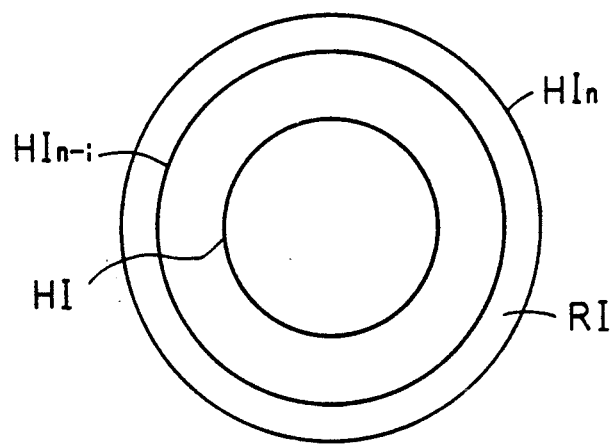
FIG. 44 illustrates a ring image.

FIG. 44 illustrates another modification in which first and second magnified hole images $HI_n$ and $HI_{n-i}$ are formed by magnifying the hole image HI by n and $(n-i)$ times, i.e., by magnifying the same at different magnification factors, respectively. The positive integers and i- are selected as $n > i$. The difference between the first and second magnified hole images $HI_n$ and $HI_{n-i}$ is calculated to obtain a ring image RI. The overlapped region WR in this modification is defined by the region on which the ring image and the pattern image PI overlap each other.

According to the fourth preferred embodiment, a radial operator detects the end points of an overlapped region. The aperture angle of a pattern image is accurately calculated as a function of the positions of the end points and a hole image or a magnified hole image. Therefore, an inspection of the pattern in a printed board can be automated and the aperture angle judgement can be accurately attained.

I. Fifth Preferred Embodiment

(I-1) Overall Structure and Operation

FIGS. 5-9 and the description regarding the same are also applied to an inspection device according to a fifth preferred embodiment of the present invention. The characteristic operation of the fifth preferred embodiment are conducted in a through hole inspecting circuitry 30d shown in FIG. 45, which is employed in place of the circuitry 30 in FIG. 10.

(I-2) Through Hole Inspecting Circuitry 30d

Figure 45:
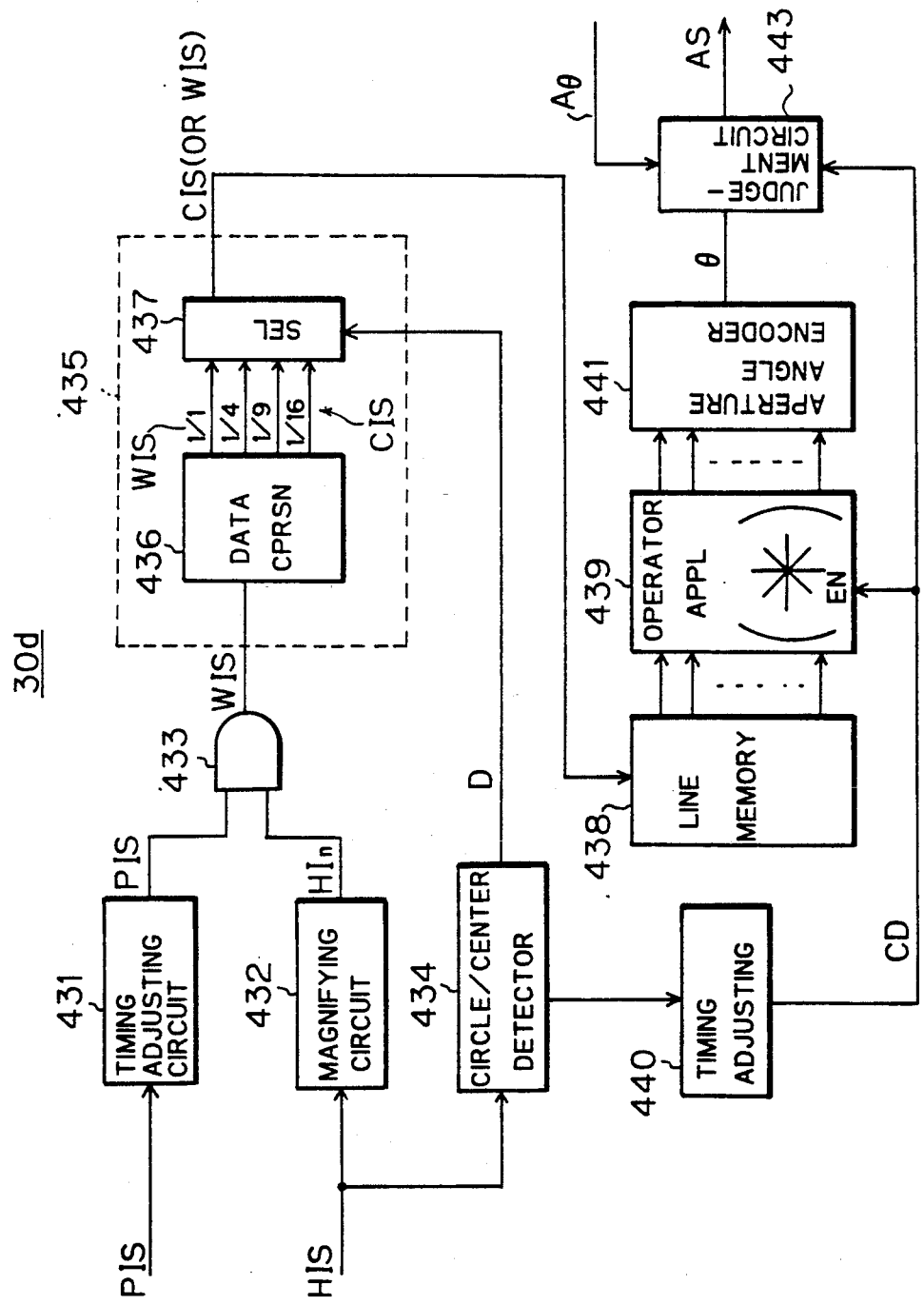
FIG. 45 is a block diagram of a through hole inspecting circuit according to a fifth preferred embodiment of the present invention.
Figure 46:
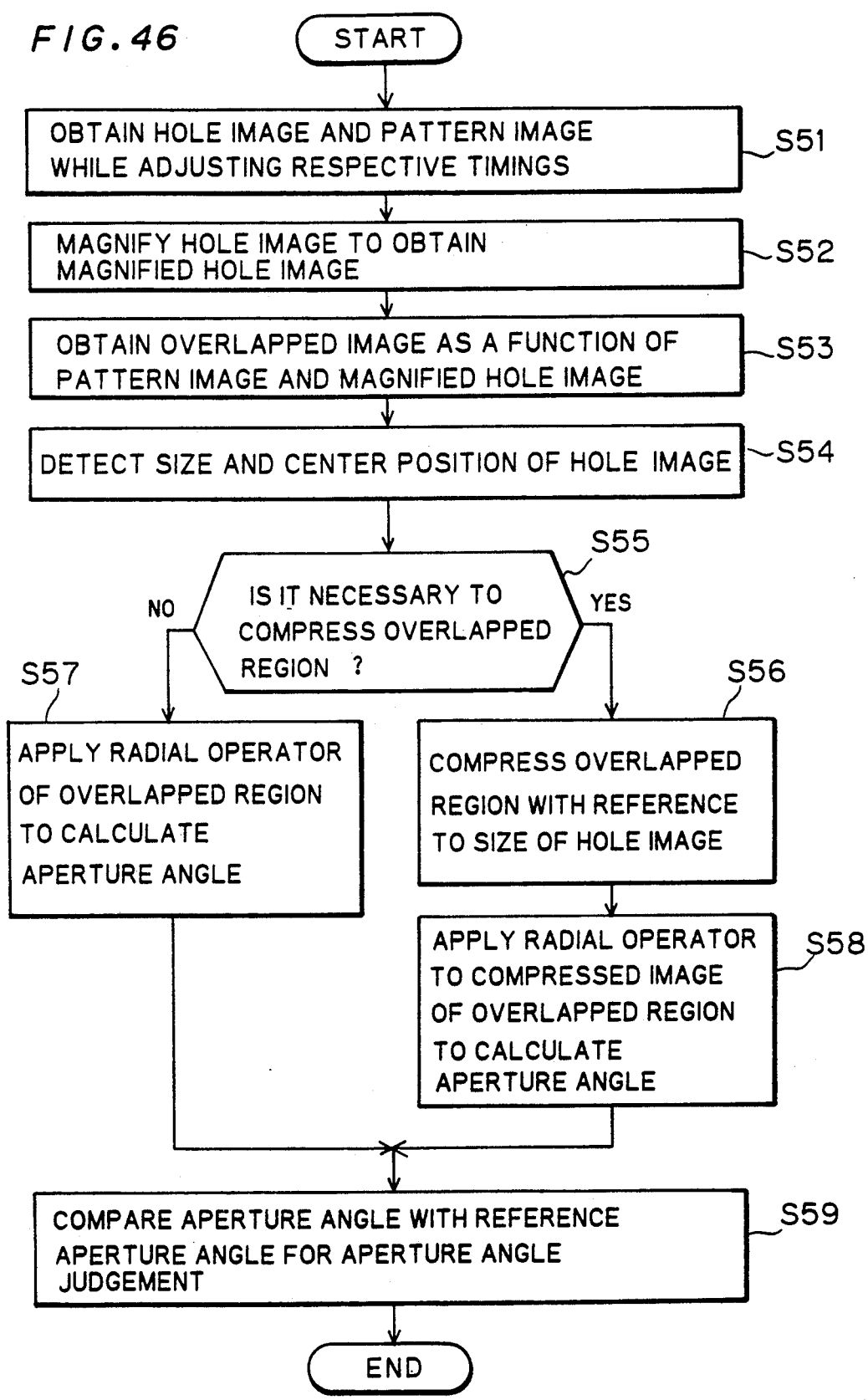
FIG. 46 is a flow chart showing the process sequence in inspecting a pattern on a printed board according to the fifth preferred embodiment of the present invention.

FIG. 45 is a block diagram showing the inner structure of the through hole inspecting circuitry 30d, while FIG. 46 is a flow chart showing a process sequence according to the fifth embodiment. The through hole inspecting circuitry 30d comprises a timing adjusting circuit 431, a magnifying circuit 432, an AND circuit 433 and a circle and center point detector 434, which have the same structures and operations with the corresponding elements in the fourth preferred embodiment, i.e., the circuits 333, 332, 334 and 340 shown in FIG. 38. Therefore, a pattern image signal PIS and a magnified hole image $HI_n$ are generated in the circuits 431 and 432, respectively, and an overlapped region image signal WIS is obtained in the AND circuit 433. The circle and center point detector 432 recognizes a circle defining the contour of the hole and detects the center point of the circle. The diameter D of the hole is calculated by averaging respective coordinates of the two cross points at which the center line of the hole crosses the circumference of the hole. The processings in these circuits are illustrated in FIG. 46 as the process steps S51-S54.

The overlapped region image signal WIS is transmitted to a data compression part 436 which is provided in a compression block 435. The data compression part 436 compresses the overlapped region WR at compression ratios $\frac{1}{4}$, 1/9 and 1/16 to generate compressed region image signals CIS representing compressed images CI (not shown). The compressed region image signals CIS and the overlapped region image signal WIS itself, which is an image with a compression ratio 1/1 (non-compression), are transmitted to a selector 437 in parallel. The inner structure of the data compression part 436 will be described later.

The selector 437 receives the diameter signal D from the circle and center position detector 434, the diameter signal D serving as a selection control signal of the selector 437. The selector selects one of the compression ratios 1/1, 1/4, 1/9 and 1/16 in accordance with the diameter D so that a compressed region image or the overlapped region image WR corresponding to the selected 1 compression ratio can be accomodated in the operation range of an operator application part 439 which is provided in the rear stage of the selector 437. One of the compressed image signals CIS or the overlapped region image signal WIS corresponding to the selected compression ratio is outputted from the selector 437. Preferably, an image having a maximum size is selected within the compressed images CI and/or the overlapped region image WR the operator application part 439 can accomodate.

Furthermore, the compression of the overlapped region image WIS may be conducted after finding whether the overlapped region image WIS itself can be accomodated in the operator application part 439. That is, the overlapped region image signal WIS is transmitted through the compression block 435 if the overlapped region image WIS can be accomodated in the operator application part 439, or alternatively, the overlapped region image WR is compressed in and outputted from the compression block 435 if the overlapped region image itself is too large to be accomodated in the operator application part 439. The compression and selection processings as modified in order are illustrated in FIG. 46 as the process steps S51 and S56. Although the following description will be directed to the case where one of the compressed image signal CIS is selected in the selector 437, the same is applied to the other case where the overlapped region image signal WIS is selected.

The selected one of the compressed image signals CIS is transmitted to a line memory 438 and is arranged into an data array on a two-dimensional plane. The compressed image signal CIS thus arranged is delivered to the operator application part 439 for each predetermined number of adjacent pixels. The circle and center position detector 434 generates a circle recognizing signal CD, which is transmitted to a timing adjusting circuit 440 and is then inputted in an enabling terminal EN of the operator application part 439 as a control signal thereof. The operator application part 439 applies a predetermined matrix operation to the compressed region image signal CIS in synchronism with the circle recognizing signal CD, whereby an aperture in the pattern image PI is detected. The operator application part 439 has an internal structure described later.

Figure 47:
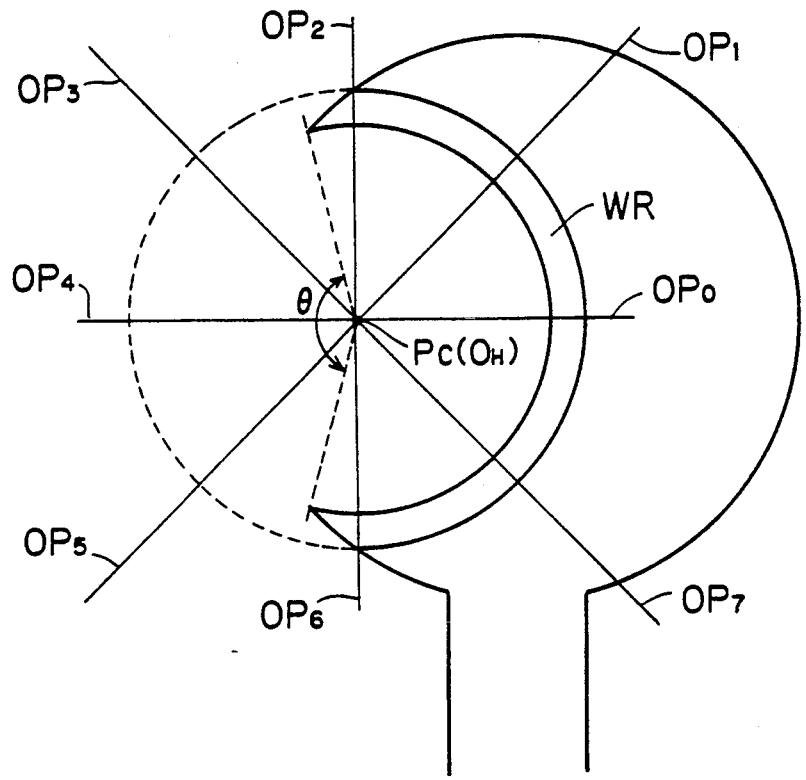
FIG. 47 illustrates a principle of detecting an opening.

FIG. 47 illustrates a process of detecting an aperture, where a radial operator consisting of eight unit operators $O_0$-$OP_7$ is shown. In the illustrated situation, a center pixel $P_C$ which is the radiating center of a radial operator is located at the center $C_H$ of the hole image HI. The radial operator and the images are relatively moved in accordance with the image scanning of the printed board, and when the radial operation reaches the position shown in FIG. 47, the circle recognizing signal CD being at a predetermined voltage level is transmitted to the enabling terminal of the operator application part 439 to enable the operator application part 439.

Within the unit operators $OP_0$-$OP_7$, the unit operators $OP_3$, $OP_4$ and $OP_5$ extending to the opening of the pattern image do not overlap the region WR. Accordingly, the logical product of the unit operator $OP_3$-$OP_5$ and the compressed region image signal CIS is "0" at respective pixels on the unit operator $OP_3$-$OP_5$. On the other hand, the unit operators $OP_0$-$OP_2$, $OP_6$ and $OP_7$ extending to the pattern image overlap the region WR. Accordingly, the logical product of the unit operator $OP_0$-$OP_2$, $OP_6$, $OP_7$ and the compressed region image signal CIS is "1" at a part of the pixels on the unit operator $OP_0$-$OP_2$, $OP_6$, $OP_7$.

An aperture angle encoder 441 receives the respective logical products of the compressed region image signal CIS and the unit operators $OP_0$-$OP_7$ in parallel. The encoder 441 counts the number of the unit operators from which the logical product "0" is obtained, and calculates the aperture angle $\theta$ from the number counted.

In the example shown in FIG. 47, the logical product obtained from the unit operator $OP_3$-$OP_5$ is "0" and that from the unit operator $OP_0$-$OP_2$, $OP_6$, $OP_7$ includes "1" as hereinabove described, and the operator application part 439 outputs "0" for the unit operator $OP_3$-$OP_5$ and "1" for the unit operators $OP_0$-$OP_2$, $OP_6$ and $OP_7$. Consequently, if the output of the operator application part 439 is expressed by an 8-bits signal whose most significant bit MSB is assigned to the unit operator $OP_7$, the operation result is [1, 1, 0, 0, 0, 1, 1, 1].

The aperture angle encoder 441 counts the number n of "0" included in the operation result and then calculates the aperture angle $\theta$ as a function of the number n and the total bit number N in the operation result, i.e., $$\theta = (n/N) \times 360° \qquad (11)$$

The numbers n and N are "3" and "8" in the example shown in FIG. 47, respectively, and therefore, $$\theta = 135° \qquad (12)$$

is obtained. Since the compressed region images CIS are obtained through the isotropic compressions of the overlapped region WR, the aperture angle $\theta$ which is calculated for selected one of the compressed region images CI is identical to the aperture angle of the overlapped region WR. Accordingly, the aperture angle of the overlapped region WR is obtained through the calculation (11). If the overlapped region WR has a plurality of apertures, respective angles of the apertures are calculated and then summed up to obtain a total aperture angle. The calculation accuracy of the aperture angle $\theta$ increases in proportion to the number of the unit operators and the number N of bits in each unit operator. The above-described processing corresponds to the process steps S57 and S58 in FIG. 46.

The aperture angle θ which is calculated in the aperture angle calculator 441 is delivered to a judgement circuit 443. The judgement circuit 443 also receives the value of a predetermined reference angle $A_\theta$ from a register and performs an aperture angle judgement. More particularly, the aperture angel θ is compared with the reference angle $A_\theta$. If the aperture angle θ is smaller than the reference angle $A_\theta$, an aperture angle judgement signal AS indicating "good (OK)" is generated. On the other hand, if the aperture angle θ is larger than the reference angle $A_\theta$, the signal AS indicates "no-good (NG)". The center coordinates of the through hole are outputted from the circuitry 30d and are displayed for a visual inspection and others.

The aperture angle judgement signal AS is transmitted to anther circuit (not shown) which is provided in the rear stage of the judgement circuit 443 for extraction of defective printed boards. These processings correspond to the process step S59 in FIG. 46. The process for the aperture angle judgement is now completed.

(I-3) Circuit Structures

Figure 48:
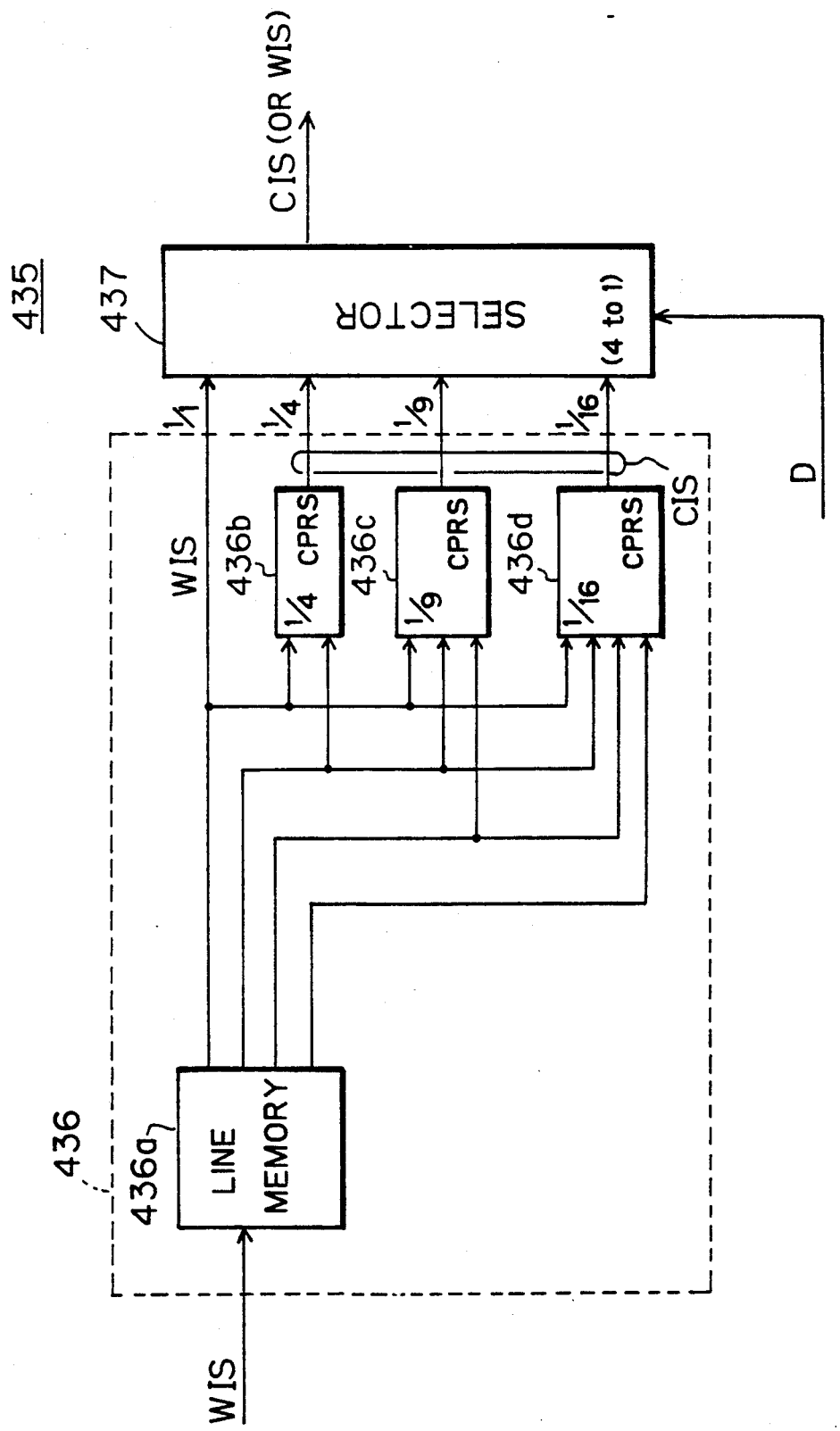
FIG. 48 is a block diagram showing the structure of a compression circuit.

Next, the circuit structures for attaining the above-described processings will be described. FIG. 48 is a block diagram showing the internal structure of the compression block 435 in FIG. 45. The data compression part 436 has a line memory 436a. The overlapped region image signal WIS is inputted in the line memory 436a and is arranged into a pixel data array on a two-dimensional plane. The pixel data in the line memory 436a are delivered to and stored in a ¼-compression block 436b for each 2×2 pixel cluster consisting of adjacent two pixels in both of the directions X and Y. Similarly, the pixel data are delivered to and stored in a 1/9-compression block 436c and 1/16-compression block 436d for each 3×3 pixel cluster and 4×4 pixel cluster, respectively.

Figure 49A:
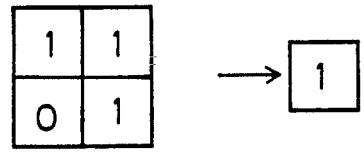
FIGS. 49A through 49C illustrate compression of image data.
Figure 49B:
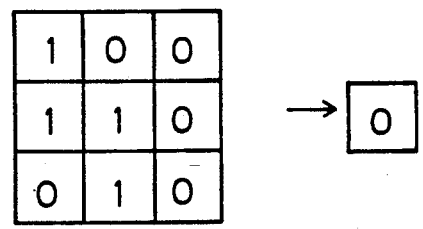
Figure 49C:
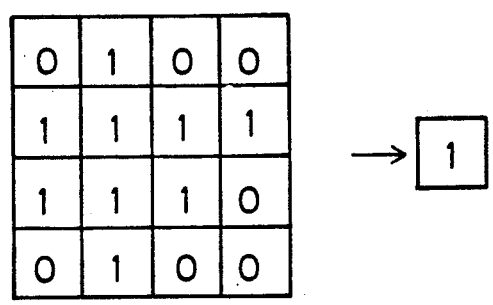

As shown in FIG. 49A, the ¼ compression block 436b compresses the respective pixel image data of the 2×2 pixel matrix in each cluster into one bit. Similarly, the 1/9 compression block 439c compresses the 3×3 pixel matrix data in each cluster into one bit while the 1/16 compression block 436d compresses the 4×4 pixel matrix data in each cluster into one bit, as shown in FIGS. 49B and 49C. The compressed region image signals CIS thus obtained are transmitted to a selector 437 together with the overlapped region signal WR. In the examples shown in FIGS. 49A-49C, the data compression is attained through a majority logic. That is, the compressed data value "1" is generated if a majority of or a half of the pixels have the data value "1" in the corresponding cluster, while the compressed data value "0" is generated if only a minority of the pixels have the data value "1". The data compression may be attained through other compression rules, e.g., skipping of pixels.

The selector 437 also receives the value of the diameter D from the circle and center position detector 434. The selector 437 includes a comparator for comparing the diameter D with a reference diameter DM which is the maximum diameter which can be processed by the operator application part 439 (FIG. 45). According to the result of the comparison, the selector 437 selects one of the compression ratios, i.e., the compression ratio "1" (non-compression) for $D \leq DM$, the compression ratio "¼" for $DM < D \leq 2DM$, the compression ratio "1/9" for $2DM < D \leq 3DM$, and the compression ratio "1/16" for $3DM < D \leq 4DM$, so that the data amount of the compressed region image having the selected compression ratio, or the overlapped region image if the condition $D \leq DM$ is satisfied, can be accomodated in the operation range of the aperture application part 439. The image having the selected compression ratio is outputted from the selector 437. Through the selecting operation, the operation range of the operator application part 439 can be effectively used for the operator application.

Figure 50:
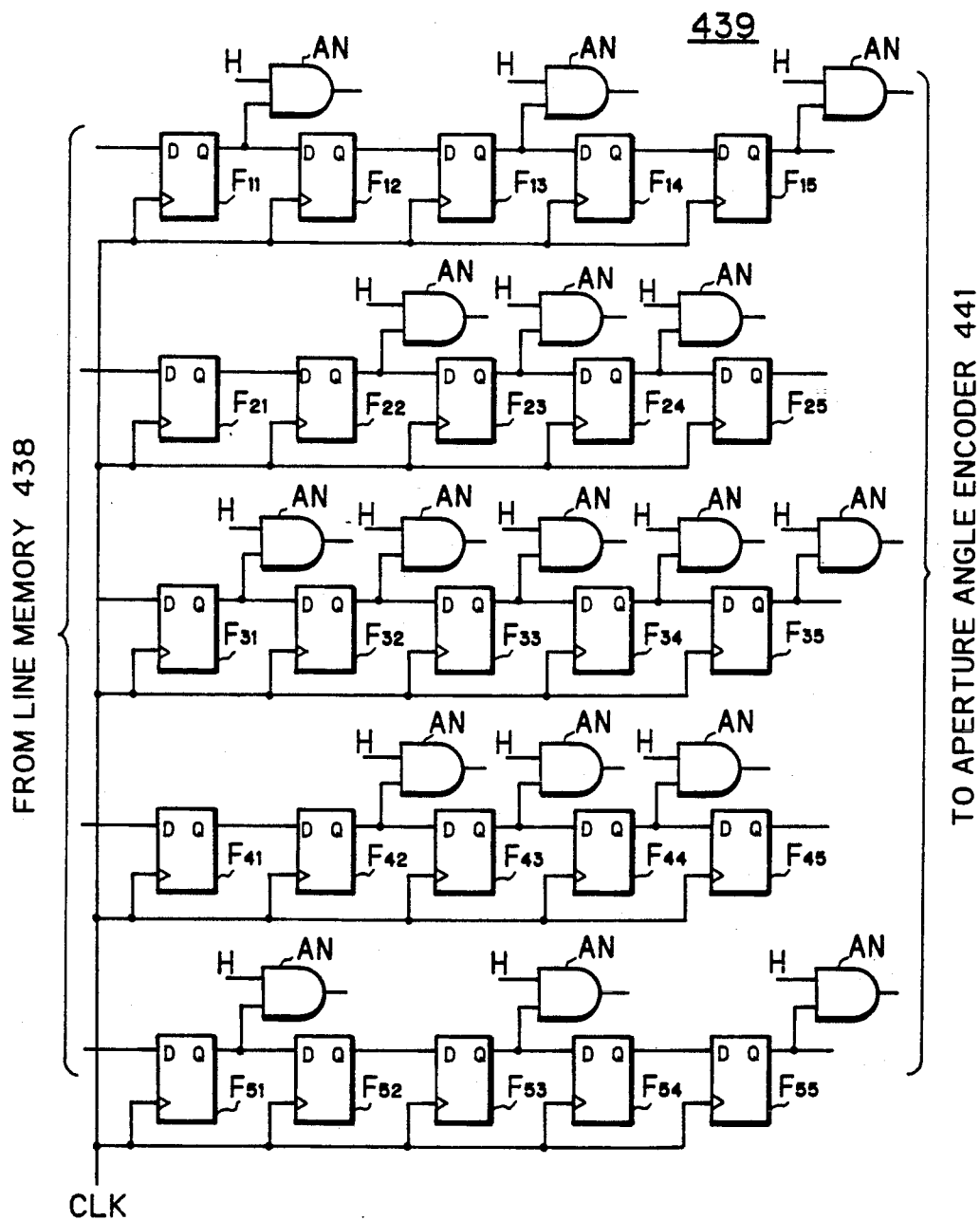
FIG. 50 is a circuit diagram showing the structure of an operator application part.

FIG. 50 is a circuit diagram of the operator application part 439 shown in FIG. 45. Although the following description is directed to the case where one of the compressed region image CIS is selected in the selector 437, the same also applied to the case where the overlapped region image WR itself is selected in the selector 437. The compressed region image signal CIS, which is arranged by the line memory 438 (FIG. 45) into a data array on a two- o dimensional plane, is transmitted to the operator application part 439 in parallel for each predetermined number of adjacent pixels. If the radial operator which is applied in the operator application part 439 is an operator defined on a 5×5 pixel matrix, the signal CIS is inputted in parallel for each group of five adjacent pixels which are continuously aligned in the direction Y. The operator application part 439 has a 5×5 matrix of data flip-flops $F_{ij}$ (i, j=-5). The serial connection of the data flip-flops $F_{ij}$ (j=1–5) in each row provides a shift register operable to serially shift the data from the left to the right in synchronism with a clock signal CLK.

Within the matrix of the data flip-flops $F_{ij}$, the respective outputs Q of the data flip-flops which are arranged in radial eight directions form the center flop-flop F33 are delivered to AND circuits AN, respectively. A constant voltage corresponding to the logical "H" level is applied to the other input terminal of each AND circuit AN, and the AND circuits AN operate as logical product gates corresponding to a radial operator having eight unit operators or arms defined in the 5×5 pixel matrix. The output of the AND circuits in the respective radial directions represent the result of applying the radial operator to the compressed region image signal CIS which is arranged into the 5×5 pixel matrix. Therefore, the number of unit operators extending to the opening of the compressed region image can be calculated by detecting the number of directions in which all of the corresponding AND circuits AN output the logical "L" level.

Figure 51A:
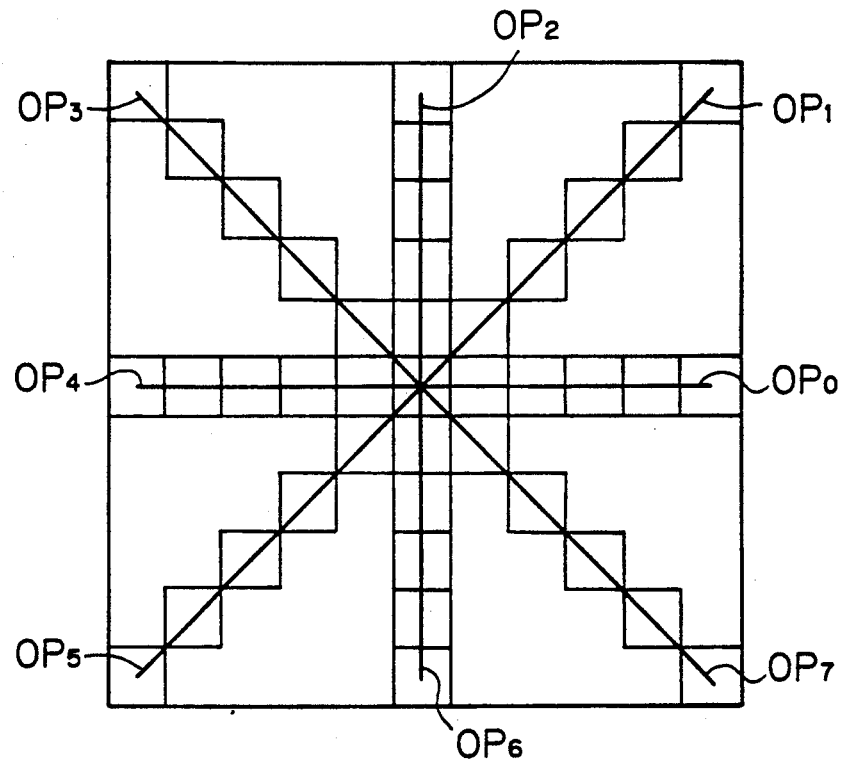
FIGS. 51A and 51B illustrate radial operators.
Figure 51B:
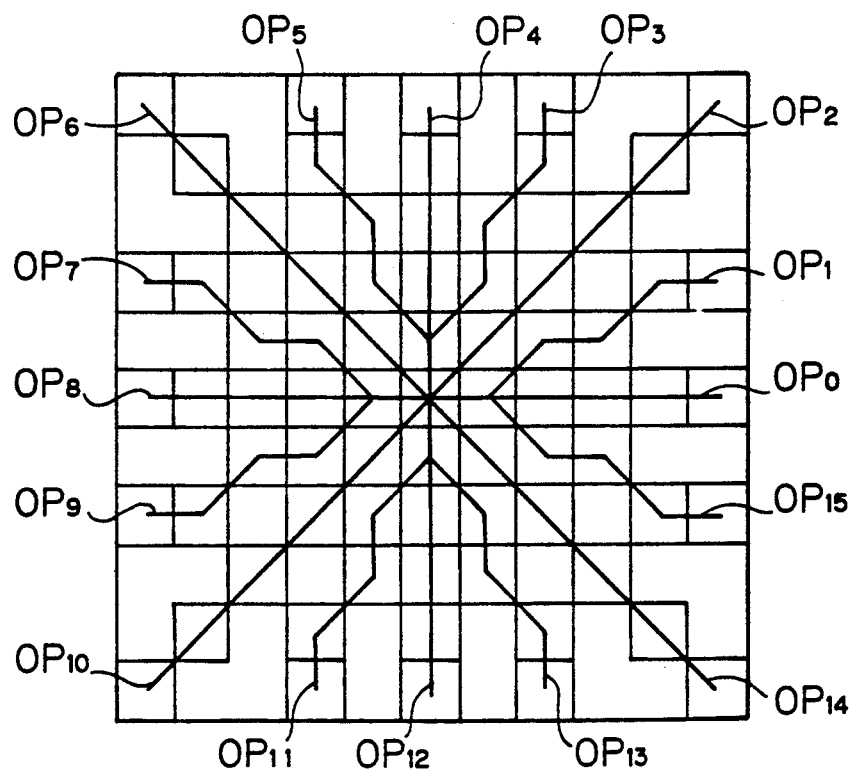

FIGS. 51A and 51B illustrate examples of radial operators defined in a 11×11 pixel matrix. The operator shown in FIG. 51A is an eight-directional radial operator consisting of unit operators $OP_0$–$OP_7$, while the other operator shown in FIG. 51B is a sixteen-directional radial operator consisting of unit operators $OP_0$–$OP_{15}$.

The accuracy in detecting the aperture angle increase in proportion to the number of unit operators. However, when the number of unit operators is relatively large, a plurality of unit operators may overlap each other at the center area of the pixel matrix. In the example shown in FIG. 51B, most of the center pixels which are included in the 3×3 center matrix belong to a plurality of unit operators extending in different directions, and the direction of the aperture is hardly detected in the center matrix. Therefore, the number of unit operators is so selected that the size of the center matrix is smaller than that of the hole image.

In practice, the resolution in image reading is about 5 $\mu$m-20 $\mu$m in most of image reading apparatus, and the diameter of through holes is about 100 $\mu$m-300 $\mu$m. Accordingly, the diameter of through holes includes at least five pixels and the direction and the size of the aperture can be detected even with the sixteen-directional radial operator. Furthermore, standard through holes have diameters corresponding to same tens of pixels and the aperture of the overlapped region image can be detected at a high accuracy with a 32-directional radial operator or the like.

As shown in FIG. 50, the operator application part 439 has the matrix of the data flip-flops $F_{ij}$ and the circuit structure thereof becomes complicated in proportion to the number of unit operators and the size of the corresponding matrix. Consequently, the above-mentioned data compression is effective in avoiding the increase of electronic elements particularly in the cases where the size of through holes is large or the through hole has a large number of pixels due to the high resolution of an image reading apparatus employed. The number of unit operators is selected while taking these conditions into consideration.

J. Modifications and Conclusion of Fifth Preferred Embodiment

The radial operator may be applied to the pattern image PI itself without obtaining the magnified hole image and the overlapped region WR. In another modification, both of the hole image HI and the pattern image PI are magnified and the overlapped region WR is obtained as a region on which the magnified hole image overlaps the magnified pattern image.

Furthermore, as shown in FIG. 44, the hole image HI may be magnified n and (n−i) time to obtain a first magnified hole image $HI_n$ and a second magnified hole image $HI_{n-i}$, respectively, where n and (n−i) are positive integers satisfying n>i. A ring image is obtained by calculating the difference between the first and second magnified images $HI_n$ and $H_{n-i}$, and an overlapped region WR is defined as the region on which the ring image and the pattern image overlap each other.

The contour of the radial operator which is defined by imaginarily and serially connecting the respective ends of the unit operators may be a rectangle, a circle or others rather than a square shown in FIGS. 51A and 51B. When a circle or a polygon approximating the same is employed, the number of data flip-flops $F_{ij}$ shown in FIG. 50 can be reduced.

The modifications which are described in the section B for the first preferred embodiment ca be also applied to the fifth preferred embodiment.

According to the fifth preferred embodiment, a radial operator is positioned at the center of the hole image to detect the opening or aperture of the pattern image and to calculate the aperture angle thereof. This method is effective in automating inspection of printed boards in which the aperture angle can be detected at a high accuracy.

Although the present invention has been described and illustrated in detail, it is clearly understood that the same is by way of illustration and example only and is not to be taken by way of limitation. The spirit and scope of the present invention should be limited only by the terms of the appended claims.

We claim

1. A method of inspecting a printed board for pattern defects, said printed board being provided with an electrically-conductive pattern and a through hole thereon, said method comprising the steps of:
    (a) photoelectrically reading an image of said printed board;
    (b) dividing said image of said printed board into a pattern image representing said electrically-conductive pattern and a hole image representing said through hole;
    (c) obtaining first and second images by selectively performing one of the steps of:
    (c-1) obtaining said first image by magnifying said pattern image and defining said second image with said hole image itself;
    (c-2) defining said first image with said pattern image itself and obtaining said second image by magnifying said hole image; and
    (c-3) obtaining said first and second images by magnifying said pattern image and said hole image, respectively;
    (d) obtaining an overlapped region image representing an overlapped region on which said first and second images overlap each other;
    (e) defining a two-dimensional radial operator having unit operators which extend from a radiant center point to different directions;
    (f) detecting end points of said overlapped region image by applying said radial operator to said overlapped region image while relatively moving said radial operator and said overlapped region image;
    (g) detecting a center point of said second image:
    (h) calculating an aperture angle of said electrically-conductive pattern as a function of positional relation between said end points and said center point of said second image; and
    (i) comparing said aperture angle with a predetermined reference angle and thereby judging whether said electrically-conductive pattern has a non-allowable defect or not.

2. A method of claim 1 wherein:
    each of the steps (c-2) and (c-3) includes the step of magnifying said hole image at different two magnification factors and thereby obtaining first and second magnified hole images, respectively, said second image consisting of said first and second magnified hole images; and
    the step (d) includes the steps of:
    (d-1) calculating a difference between said first and second magnified hole images and thereby obtaining a ring image; and
    (d-2) generating an image which represents a region on which said first image and said ring image overlap each other, whereby said overlapped region image is obtained.

3. A method of claim 1, wherein:
    the step (f) includes the steps of:
    (f-1) obtaining a logical pattern in which a result of applying said radial operator to said overlapped region image is represented by a radial arrangement of arms each of which is a chain of bits being ar first and/or second logical levels;
    (f-2) within said arms, detecting a first arm only including said first logical level and a detecting a second arm including said first logical level at only one bit, said second arm extending in a direction reverse to said first arm;

(f-3) identifying one of said end points by a current position of said radiant center point at which both of said first and second arms are detected; and (f-4) repeating the steps (f-2) and (f-3) while region image until all of said end points are identified.

4. An apparatus for inspecting a printed board for pattern defects, said printed board being provided with an electrically-conductive pattern and a through hole therein, said apparatus comprising:

(a) image reader means for photoelectrically reading an image of said printed board;

(b) means for dividing said image of said printed board into a pattern image representing said electrically-conductive pattern and a hole image representing said through hole;

(c) means for obtaining first and second images as a function of said pattern image and said hole image, respectively, where at least one of said first and second images is magnified in size as compared with corresponding one of said pattern image and said hole image;

(d) means for obtaining an overlapped region image representing an overlapped region on which said first and second images overlap each other;

(e) logic circuit means for defining a two-dimensional dimensional radial operator having unit operators which extend from a radiant center point to different directions;

(f) means for serially supplying respective parts of said overlapped region image to said logic circuit means; (g) means for detecting end points of said overlapped image as a function of output signals of said logic circuit means;

(h) means for detecting a center point of said second image;

(i) means for calculating an aperture angle of said electrically-conductive pattern as a function of positional relation between said end points and said center point of said second image; and (j) means for comparing said aperture angle with a predetermined reference angle and thereby judging whether said electrically-conductive pattern has a non-allowable defect or not.

* * * * *